(12) United States Patent
Kim et al.

(10) Patent No.: US 10,543,477 B2
(45) Date of Patent: Jan. 28, 2020

(54) POLYMER CAPSULE HAVING LOADED THEREON TRANSITION METAL PARTICLES HAVING EXCELLENT WATER DISPERSIBILITY AND STABILITY, AND METHOD FOR PREPARING SAME

(71) Applicants: INSTITUTE FOR BASIC SCIENCE, Daejeon (KR); POSTECH ACADEMY-INDUSTRY FOUNDATION, Gyeongsangbuk-do (KR)

(72) Inventors: Kimoon Kim, Gyeongsangbuk-do (KR); Gyeongwon Yun, Gyeongsangbuk-do (KR); Zahid Hassan, Gyeongsangbuk-do (KR); Jiyeong Lee, Gyeongsangbuk-do (KR); Jeehong Kim, Gyeongsangbuk-do (KR); Nam Hoon Kim, Gyeongsangbuk-do (KR); Kangkyun Baek, Gyeongsangbuk-do (KR); Ilha Hwang, Gyeongsangbuk-do (KR)

(73) Assignees: INSTITUTE FOR BASIC SCIENCE, Daejeon (KR); POSTECH ACADEMY-INDUSTRY FOUNDATION, Gyeongsangbuk-do (KR)

( * ) Notice: Subject to any disclaimer, the term of this patent is extended or adjusted under 35 U.S.C. 154(b) by 63 days.

(21) Appl. No.: 15/586,068

(22) Filed: May 3, 2017

(65) Prior Publication Data

US 2017/0320045 A1 Nov. 9, 2017

Related U.S. Application Data

(62) Division of application No. 15/303,710, filed as application No. PCT/KR2015/003821 on Apr. 16, 2015, now Pat. No. 9,707,548.

(30) Foreign Application Priority Data

Apr. 16, 2014 (KR) .................. 10-2014-0045394
Apr. 15, 2015 (KR) .................. 10-2015-0053065

(51) Int. Cl.
| | | |
|---|---|---|
| *B01J 23/52* | (2006.01) | |
| *B01J 31/06* | (2006.01) | |
| *C08J 7/06* | (2006.01) | |
| *C08J 7/12* | (2006.01) | |
| *B01J 23/44* | (2006.01) | |
| *B01J 23/42* | (2006.01) | |
| *B01J 35/00* | (2006.01) | |
| *B01J 13/18* | (2006.01) | |
| *B01J 33/00* | (2006.01) | |
| *B82Y 30/00* | (2011.01) | |
| *B01J 35/02* | (2006.01) | |
| *B01J 37/02* | (2006.01) | |
| *B01J 37/16* | (2006.01) | |

(52) U.S. Cl.
CPC ............... *B01J 23/52* (2013.01); *B01J 13/18* (2013.01); *B01J 23/42* (2013.01); *B01J 23/44* (2013.01); *B01J 31/06* (2013.01); *B01J 33/00* (2013.01); *B01J 35/002* (2013.01); *B01J 35/0033* (2013.01); *B01J 35/0086* (2013.01); *B01J 35/02* (2013.01); *B01J 35/023* (2013.01); *B01J 37/0201* (2013.01); *B82Y 30/00* (2013.01); *C08J 7/06* (2013.01); *C08J 7/12* (2013.01); *B01J 37/16* (2013.01); *C08J 2381/02* (2013.01)

(58) Field of Classification Search
None
See application file for complete search history.

(56) References Cited

U.S. PATENT DOCUMENTS

| | | | |
|---|---|---|---|
| 2007/0092867 A1* | 4/2007 | Kim .................. | B01D 15/3804 435/5 |
| 2008/0175920 A1 | 7/2008 | Kim et al. | |
| 2011/0311639 A1 | 12/2011 | Balasubramanian et al. | |

FOREIGN PATENT DOCUMENTS

| | | |
|---|---|---|
| KR | 1020030034085 A | 5/2003 |
| KR | 100638516 B1 | 11/2006 |
| KR | 1020090008916 A | 1/2009 |

(Continued)

OTHER PUBLICATIONS

Baek et al. JACS, 135, 6523-6528 (Year: 2013).*

(Continued)

*Primary Examiner* — Yun Qian
(74) *Attorney, Agent, or Firm* — McCoy Russell LLP

(57) ABSTRACT

Provided are a polymer capsule loaded with transition metal particles having excellent water dispersibility and stability, and a method for preparing the same. Specifically, the polymer capsule loaded with transition metal particles according to the present invention includes a surface-modified polymer capsule surface-modified to thereby have a positive zeta potential in a dispersed state in water; and transition metal particles loaded on a surface of the surface-modified polymer capsule. In addition, a method for preparing a polymer capsule loaded with transition metal particles according to the present invention includes a) preparing a polymer capsule; b) surface-modifying the polymer capsule to prepare a polymer capsule having a positive zeta potential in a dispersed state in water; and c) sequentially adding a water-soluble transition metal precursor and a reducing agent to a water dispersion of the surface-modified polymer capsule obtained in step b).

1 Claim, 30 Drawing Sheets

(56) References Cited

FOREIGN PATENT DOCUMENTS

KR     100988321 B1    10/2010
KR     101118588 B1    6/2012

OTHER PUBLICATIONS

Kim et al. Angew. Chem. Int. Ed. 46, 3471-3474 (Year: 2007).*
Baek et al., JACS, 135, 6523-6528, supported information (Year: 2013).*
Kim, D. et al., "Direct Synthesis of Polymer Nanocapsules with a Noncovalently Tailorable Surface," Angewandte Chemie, vol. 46, No. 19, May 4, 2007, Published Online Jan. 15, 2007, 5 pages.
ISA Korean Intellectual Property Office, International Search Report Issued in Application No. PCT/KR2015/003821, dated Jun. 29, 2015, WIPO, 4 pages.

* cited by examiner

POLYMER CAPSULE HAVING LOADED THEREON TRANSITION METAL PARTICLES HAVING EXCELLENT WATER DISPERSIBILITY AND STABILITY, AND METHOD FOR PREPARING SAME

CROSS REFERENCE TO RELATED APPLICATIONS

The present application is a divisional of U.S. patent application Ser. No. 15/303,710, entitled "POLYMER CAPSULE HAVING LOADED THEREON TRANSITION METAL PARTICLES HAVING EXCELLENT WATER DISPERSIBILITY AND STABILITY, AND METHOD FOR PREPARING SAME", filed on Oct. 12, 2016. U.S. patent application Ser. No. 15/303,710 is a U.S. National Phase of International Patent Application Serial No. PCT/KR2015/003821, entitled "POLYMER CAPSULE HAVING LOADED THEREON TRANSITION METAL PARTICLES HAVING EXCELLENT WATER DISPERSIBILITY AND STABILITY, AND METHOD FOR PREPARING SAME," filed on Apr. 16, 2015. International Patent Application Serial No. PCT/KR2015/003821 claims priority to Korean Patent Application No. 10-2014-0045394, filed on Apr. 16, 2014, and to Korean Patent Application No. 10-2015-0053065, filed on Apr. 15, 2015. The entire contents of each of the above-cited applications are hereby incorporated by reference in their entirety for all purposes.

TECHNICAL FIELD

The present invention relates to a polymer capsule loaded with transition metal particles, and a method for preparing the same, and more particularly, to a polymer capsule on which ultra-fine transition metal particles are uniformly and homogeneously loaded through a simple process composed of two steps to thereby be chemically bonded, and a method for preparing the same.

BACKGROUND ART

Metal nanoparticles have received much attention in various fields due to characteristic properties such as a significantly wide surface area as compared to volume, a quantum confinement effect, a surface plasmon effect, and the like.

These properties of the metal nanoparticles are significantly affected by a size and surface thereof and a supporter, and as the supporter on which the metal nanoparticles are loaded, a polymer or dendrimer, silica, metal oxides, and the like, have been mainly used.

Particularly, a structure in which the metal nanoparticles are loaded on the supporter has been actively studied in a catalyst field, but there are problems such as a low surface activity, low stability, low dispersibility, continuous inactivation/leaching of a catalyst, or the like. As an example, a metal catalyst loaded on mesoporous silica is known to be significantly unstable and be rapidly inactivated/leached at the time of a catalytic reaction (R. B. Bedford, U. G. Singh, R. I. Walton, R. T. Williams, S. A. Davis, Chem. Mater. 2005).

Further, research into metal nanoparticles which are stable while having a catalytic activity in an eco-friendly solvent such as water has been importantly considered in a green chemistry field due to environmental and economical reasons and safety. However, research into catalytic reactions in water using a structure in which nanoparticles are loaded on a supporter has not yet been actively conducted (M. L. Kantam, S. Roy, M. Roy, B. Sreedhar, B. M. Choudary, Adv. Synth. Catal. 2005).

DISCLOSURE

Technical Problem

An object of the present invention is to provide a polymer capsule loaded with transition metal particles having excellent stability and water dispersibility, on which ultra-fine crystalline transition metal nanoparticles are homogeneously loaded.

Another object of the present invention is to provide a method for preparing a polymer capsule loaded with transition metal particles.

Technical Solution

In one general aspect, a polymer capsule loaded with transition metal particles contains: a surface-modified polymer capsule obtained by copolymerizing a compound represented by the following Chemical Formula 1 and a compound represented by the following Chemical Formula 2 with each other, and surface-modified to thereby have a positive zeta potential in a dispersed state in water; and transition metal particles loaded on a surface of the surface-modified polymer capsule.

In another general aspect, a method for preparing a polymer capsule loaded with transition metal particles includes: a) preparing a polymer capsule by copolymerizing a compound represented by the following Chemical Formula 1 and a compound represented by the following Chemical Formula 2 with each other; b) surface-modifying the polymer capsule to prepare a surface-modified polymer capsule having a positive zeta potential in a dispersed state in water; and c) sequentially adding a water-soluble transition metal precursor and a reducing agent to a water dispersion of the surface-modified polymer capsule obtained in step b).

[Chemical Formula 1]

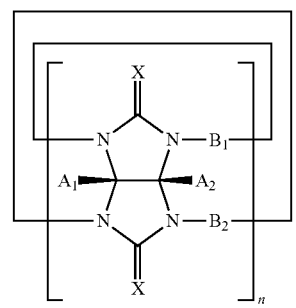

(In Chemical Formula 1, X is O, S, or NH, $A_1$ and $A_2$ are each independently $-OR_1$, $-SR_2$, $-NHR_3$, or $-OC(=O)R_4$, $R_1$ to $R_4$ being each independently a substituted or unsubstituted (C2-C20)alkenyl group or a substituted or unsubstituted (C2-C20)alkynyl group, $B_1$ and $B_2$ are each independently a substituted or unsubstituted (C1-C10)alkylene group, and n is an integer of 4 to 20.)

$(HS)_j-Z-(SH)_k$            [Chemical Formula 2]

(In Chemical Formula 2, Z is a substituted or unsubstituted (C1-C20)alkylene group, and j and k are each independently an integer of 1 to 3).

Advantageous Effects

The polymer capsule loaded with transition metal particles according to the present invention may have significantly stable water dispersibility and have a high catalytic activity and recyclability at the time of being used as a catalyst in water Further, the method for preparing a polymer capsule loaded with transition metal particles according to the present invention has an advantage in that the transition metal-polymer capsule in which monocrystalline transition metal nanoparticles having an ultra-fine size are chemically bound is prepared.

DESCRIPTION OF DRAWINGS

FIG. 1A illustrates results of measuring particle size distribution of the polymer capsule (reference numeral 1 in FIG. 1A) synthesized by photopolymerization and the surface-modified polymer capsule (reference number 2 in FIG. 1A) using the dynamic light scattering device (DLS-7000, Otsuka Electronics).

BEST MODE

Figure 1A:
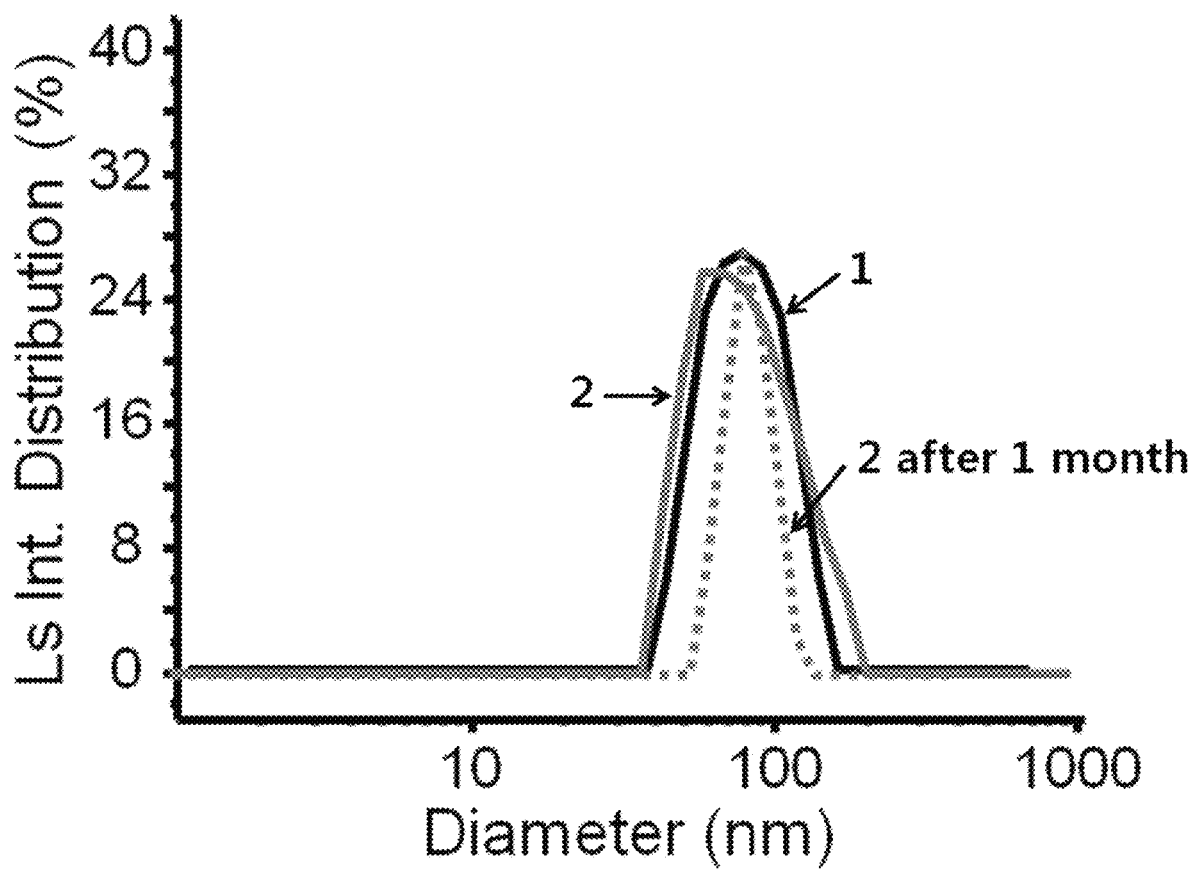
FIG. 1A is a view illustrating particle size distribution.

Hereinafter, a manufacturing method according to the present invention will be described in detail with reference to the accompanying drawings. The following accompanying drawings are provided by way of example so that the idea of the present invention can be sufficiently transferred to those skilled in the art to which the present invention pertains. Therefore, the present invention is not limited to the drawings to be provided below, but may be modified in different forms. In addition, the drawings to be provided below may be exaggerated in order to clarify the scope of the present invention. Here, technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

A polymer capsule loaded with transition metal particles according to an exemplary embodiment of the present invention may contain: a surface-modified polymer capsule obtained by copolymerizing a compound represented by the following Chemical Formula 1 and a compound represented by the following Chemical Formula 2 with each other, and surface-modified to thereby have a positive zeta potential in a dispersed state in water; and transition metal particles loaded on a surface of the surface-modified polymer capsule.

The polymer capsule loaded with transition metal particles as described above may have excellent stability in the dispersed state in water and have a high catalytic activity and recyclability at the time of being used as a catalyst in water.

The compound represented by Chemical Formula 1 according to the exemplary embodiment of the present invention may be a cucurbituril derivative having the following structure.

[Chemical Formula 1]

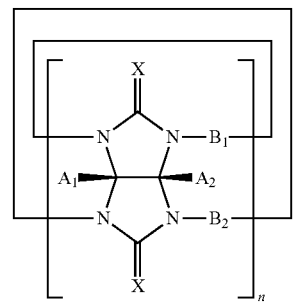

In Chemical Formula 1, X is O, S, or NH, $A_1$ and $A_2$ are each independently $-OR_1$, $-SR_2$, $-NHR_3$, or $-OC(=O)R_4$, $R_1$ to $R_4$ being each independently a substituted or unsubstituted (C2-C20)alkenyl group or a substituted or unsubstituted (C2-C20)alkynyl group, $B_1$ and $B_2$ are each independently a substituted or unsubstituted (C1-C10)alkylene group, and n is an integer of 4 to 20.

Preferably, in Chemical Formula 1, X may be O, $A_1$ and $A_2$ may be each independently $-OR_1$ or $-OC(=O)R_4$, $R_1$ to $R_4$ being each independently a substituted or unsubstituted (C2-C10)alkenyl group or a substituted or unsubstituted (C2-C10)alkynyl group, $B_1$ and $B_2$ may be each independently a substituted or unsubstituted (C1-C10)alkylene group, and n may be an integer of 4 to 12.

More preferably, in Chemical Formula 1, X may be O, $A_1$ and $A_2$ may be each independently —$OR_1$, $R_1$ being an ethenyl group (—CH═$CH_2$), a 2-propenyl group (—$CH_2$CH═$CH_2$), a 3-butenyl group (—$CH_2CH_2$CH═$CH_2$), a 4-pentenyl group (—$CH_2CH_2CH_2$CH═$CH_2$), an ethynyl group (—C≡CH), a propynyl group (—$CH_2$CCH), a pentynyl group (—$CH_2CH_2CH_2$CCH), or the like, $B_1$ and $B_2$ may be a methylene group (—$CH_2$—) or an ethylene group (—$CH_2CH_2$—), and n may be an integer of 4 to 12.

The compound represented by Chemical Formula 2 according to the exemplary embodiment of the present invention, which is a material forming the polymer capsule together with the compound represented by Chemical Formula 1 by copolymerization, may be an aliphatic compound having two or more thiol groups.

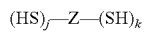
[Chemical Formula 2]

(In Chemical Formula 2, Z is a substituted or unsubstituted (C1-C20)alkylene group, and j and k are each independently an integer of 1 to 3.

Preferably, in Chemical Formula 2, Z is a substituted or unsubstituted (C6-C20)alkylene group, and j and k are each independently an integer of 1 to 3.

A specific example of the compound represented by Chemical Formula 2 may include 1,6-hexanedithiol, 1,8-octanedithiol, 3,6-dioxa-1,8-octanedithiol, 1,4-dimercaptobutane-2,3-diol, pentaerythritol tetrakis(3-mercaptopropionate), trimethylolpropane tris(3-mercaptopropionate), or the like, but is not limited thereto.

Here, unless particularly described in the specification, in Chemical Formulas 1 and 2, the term "substitution" and "substituted" means that at least one atom is substituted with one or more substituents selected from the group consisting of oxygen (O), sulfur (S), nitrogen (N), halogen (F, Cl, Br, or I), a hydroxyl group, a ketone group, an ester group, and the like.

The polymer capsule obtained by copolymerizing the compound represented by Chemical Formula 1 and the compound represented by Chemical Formula 2 has a negative zeta potential by a functional group (C═O, S═S, or C═NH) in Chemical Formula 1, and it is possible to allow the polymer capsule to have a positive zeta potential in the dispersed state in water by surface-modifying the polymer capsule having the negative zeta potential. The surface-modified polymer capsule may have a zeta potential of 60 to 90 mV in the dispersed state in water, that is, in a state in which a matrix is water.

This positive potential, preferably, the zeta potential of 60 to 90 mV may improve dispersion stability of the polymer capsule when the transition metal nanoparticles nucleate and grow on a surface of the polymer capsule, thereby making it possible to allow transition metal nanoparticles to be uniformly formed on the entire surface of the polymer capsule.

In detail, the surface-modified polymer capsule may be a polymer capsule on which a sulfonium group having a positive charge is formed. Sulfur of the sulfonium group may voluntarily and strongly bind to a transition metal. That is, in the polymer capsule of which the sulfonium group is formed on the surface, a nucleation site of the transition metal may be provided by the sulfonium group, such that ultra-fine transition metal particles having an average diameter of 1.5 to 3.5 nm may be homogeneously loaded on the polymer capsule at a uniform size. In addition, as the transition metal of the transition metal particles is chemically bound to sulfur of the sulfonium group, the transition metal particles may be strongly and stably attached to the polymer capsule.

In the polymer capsule on which the transition metal particles are loaded as described above, 0.1 to 12 parts by weight, more preferably 1 to 10 parts by weight of a particulate transition metal may be loaded based on 100 parts by weight of the polymer capsule. As the ultra-fine transition metal particles are loaded on the surface of the polymer capsule at the above-mentioned ratio, the polymer capsule may have a high catalytic activity and recyclability at the time of being used as the catalyst in water.

In this case, the transition metal particles according to the exemplary embodiment is not particularly limited, but may be formed of one or more selected from Au, Ag, Pd, and Pt.

A method for preparing a polymer capsule loaded with transition metal particles as described above may include: a) preparing a polymer capsule by copolymerizing a compound represented by Chemical Formula 1 and a compound represented by Chemical Formula 2 with each other; b) surface-modifying the polymer capsule to prepare a polymer capsule having a positive zeta potential in a dispersed state in water; and c) sequentially adding a water-soluble transition metal precursor and a reducing agent to a water dispersion of the surface-modified polymer capsule obtained in step b).

The compound represented by Chemical Formula 1 according to the exemplary embodiment of the present invention may be a cucurbituril derivative having the following structure.

[Chemical Formula 1]

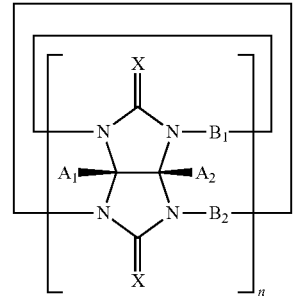

In Chemical Formula 1, X is O, S, or NH, $A_1$ and $A_2$ are each independently —$OR_1$, —$SR_2$, —$NHR_3$, or —OC(═O)$R_4$, $R_1$ to $R_4$ being each independently a substituted or unsubstituted (C2-C20)alkenyl group or a substituted or unsubstituted (C2-C20)alkynyl group, $B_1$ and $B_2$ are each independently a substituted or unsubstituted (C1-C10)alkylene group, and n is an integer of 4 to 20.

Preferably, in Chemical Formula 1, X may be O, $A_1$ and $A_2$ may be each independently —$OR_1$ or —OC(═O)$R_4$, $R_1$ to $R_4$ being each independently substituted or unsubstituted (C2-C10)alkenyl or substituted or unsubstituted (C2-C10) alkynyl, $B_1$ and $B_2$ may be each independently substituted or unsubstituted (C1-C10)alkylene, and n may be an integer of 4 to 12.

More preferably, in Chemical Formula 1, X may be O, $A_1$ and $A_2$ may be each independently —$OR_1$, $R_1$ being an ethenyl group (—CH═$CH_2$), a 2-propenyl group (—$CH_2$CH═$CH_2$), a 3-butenyl group (—$CH_2CH_2$CH═$CH_2$), a 4-pentenyl group (—$CH_2CH_2CH_2$CH═$CH_2$), an ethynyl group (—C≡CH), a propynyl group (—$CH_2$CCH), a pentynyl group (—CH$_2$CH$_2$CH$_2$CCH), or the like, B$_1$ and B$_2$ may be a methylene group (—CH$_2$—) or ethylene group (—CH$_2$CH$_2$—), and n may be an integer of 4 to 12.

The compound represented by Chemical Formula 2 according to the exemplary embodiment of the present invention, which is a material forming the polymer capsule together with the compound represented by Chemical Formula 1 by copolymerization, may be an aliphatic compound having two or more thiol groups.

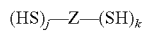  [Chemical Formula 2]

(In Chemical Formula 2, Z is a substituted or unsubstituted (C1-C20)alkylene group, and j and k are each independently an integer of 1 to 3).

Preferably, in Chemical Formula 2, Z is a substituted or unsubstituted (C6-C20)alkylene group, and j and k are each independently an integer of 1 to 3.

A specific example of the compound represented by Chemical Formula 2 may include 1,6-hexanedithiol, 1,8-octanedithiol, 3,6-dioxa-1,8-octanedithiol, 1,4-dimercaptobutane-2,3-diol, pentaerythritol tetrakis(3-mercaptopropionate), trimethylolpropane tris(3-mercaptopropionate), or the like, but is not limited thereto.

Here, unless particularly described in the specification, in Chemical Formulas 1 and 2, the term "substitution" and "substituted" means that at least one atom is substituted with one or more substituents selected from the group consisting of oxygen (O), sulfur (S), nitrogen (N), halogen (F, Cl, Br, or I), a hydroxyl group, a ketone group, an ester group, and the like.

The polymer capsule may be prepared by a copolymerization reaction between the compound represented by Chemical Formula 1 and the compound represented by Chemical Formula 2, in detail, a photopolymerization reaction between the compound represented by Chemical Formula 1, having 3 to 20 ethenyl groups (—CH═CH$_2$) or ethynyl group (—C≡CH) and the compound represented by Chemical Formula 2, having two or more thiol groups. This reaction is a reaction known in the art as a thiol-ene photopolymerization reaction (Macromolecules, 2002, 35, 5361; Macromolecules, 2003, 36, 4631).

More specifically, step a) may include dissolving the compound represented by Chemical Formula 1 and the compound represented by Chemical Formula 2 in an organic solvent; preparing the polymer capsule by copolymerizing the compound represented by Chemical Formula 1 and the compound represented by Chemical Formula 2 through light irradiation; and removing residues using dialysis. As the organic solvent used in step a), any solvent may be used as long as the compound represented by Chemical Formula 1 and the compound represented by Chemical Formula 2 are dissolved therein. As a specific example, one or more solvents selected from chloroform, methyl alcohol, ethyl alcohol, dimethyl sulfoxide, dichloromethane, dimethylformamide, tetrahydrofuran, acetone, and acetonitrile may be used. At the time of light irradiation, ultraviolet (UV) light, specifically, UV light in a wavelength range of 254 to 300 nm may be irradiated for 5 to 8 hours, thereby making it possible to copolymerize the compound represented by Chemical Formula 1 and the compound represented by Chemical Formula 2. At the time of the copolymerization reaction, a radical initiator may be added to the solution in which the compound represented by Chemical Formula 1 and compound represented by Chemical Formula 2 are dissolved before irradiating the UV light, and the copolymerization reaction may be further promoted by the radical initiator as described above. As the radical initiator, any radical initiator may be used as long as it is known to be used in the thiol-ene photopolymerization reaction. As a specific example, the radical initiator may be one or more selected from AlBN, K$_2$S$_2$O$_8$, (NH$_4$)$_2$S$_2$O$_8$, and benzoyl peroxide, but is not limited thereto.

In step a), an excessive amount of the compound represented by Chemical Formula 2 may be used as compared to the compound represented by Chemical Formula 1. For example, a molar ratio of the compound represented by Chemical Formula 1 to the compound represented by Chemical Formula 2 may be 1:40 to 60, but is not limited thereto. The polymer capsule is prepared by polymerizing the compound represented by Chemical Formula 1 and the compound represented by Chemical Formula 2 using the thiol-ene photopolymerization reaction as described above, wherein the compound represented by Chemical Formula 2 may be added in an amount of 40 to 60 moles based on 1 mole of the compound represented by Chemical Formula 1. That is, after dissolving the compound represented by Chemical Formula 1 and the compound represented by Chemical Formula 2 in the organic solvent so that the amount of the compound represented by Chemical Formula 2 is 40 to 60 moles based on 1 mole of the compound represented by Chemical Formula 1, the light may be irradiated.

Protrusions of a disulfide loop may be formed on a surface of a copolymer capsule by adding the compound represented by Chemical Formula 2 in a significantly excessive amount based on the compound represented by Chemical Formula 1, and this disulfide loop may serve as dithiol sources capable of strongly binding to the transition metal nanoparticles. Preferably, the light may be irradiated after dissolving the compound represented by Chemical Formula 1 and the compound represented by Chemical Formula 2 so that the amount of the compound represented by Chemical Formula 2 is 45 to 55 moles based on 1 mole of the compound represented by Chemical Formula 1. In this range, the thiol-ene photopolymerization reaction may be smoothly carried out, and at the same time, it is possible to prevent activity of the transition metal nanoparticles from being deteriorated by significantly excessive disulfide loop.

Hereinafter, unless particularly described, the polymer capsule prepared by polymerization of the compound represented by Chemical Formula 1 and the compound represented by Chemical Formula 2 in step a) is entirely used as a raw material of surface-modification, and the surface-modified polymer capsule may be entirely dispersed in water to thereby be prepared as the water dispersion of the surface-modified polymer capsule.

The polymer capsule prepared by copolymerization of the compound represented by Chemical Formula 1 and the compound represented by Chemical Formula 2 may be used as a carrier on which the transition metal nanoparticles are loaded.

When the polymer capsule is prepared by polymerizing the compound represented by Chemical Formula 1 and the compound represented by Chemical Formula 2 using the thiol-ene photopolymerization reaction in step a), the polymer capsule has a negative zeta potential by the C═O, C═S, or C═NH functional group in Chemical Formula 1.

In step b), the polymer capsule may be surface-modified so as to have a positive zeta potential in the dispersed state in water, that is, a state in which a matrix is water.

Surface-modification may be performed using a surface-modifier allowing a surface of the prepared polymer capsule to have a positive charge so that the polymer capsule has a zeta potential of 60 to 90 mV in the state in which the matrix is water.

This positive potential, preferably, the zeta potential of 60 to 90 mV may improve dispersion stability of the polymer capsule when the transition metal nanoparticles nucleate and grow on the surface of the polymer capsule in step c), thereby making it possible to allow transition metal nanoparticles to be uniformly formed on the entire surface of the polymer capsule.

Further, the positive potential, preferably, the zeta potential of 60 to 90 mV may enable to stable and uniform supply a material (supply of a transition metal source) to the polymer capsule at the time of nucleation and growth of the transition metal by a reducing agent in addition to improving the dispersion stability as described above. In detail, as described below, it is preferable that a water-soluble transition metal precursor is an alkali metal-transition metal halide. The reason is that the water-soluble transition metal precursor may be dissociated into an alkali metal cation and a transition metal halide anion in a water phase. Therefore, the transition metal added to the water dispersion of the polymer capsule before being reduced by the reducing agent may exist as the transition metal halide anion. In the case in which the surface of the polymer capsule is surface-modified so as to have a positive potential, preferably, a potential of 60 to 90 mV, the transition metal halide anions may uniformly enclose around the polymer capsule by electrostatic force between the polymer capsule having the positive charge and the transition metal halide having the negative charge, and while the nucleation and growth of the transition metal on the surface of the polymer capsule occur by the reducing agent, the transition metal source may be stably supplied to the surface of the polymer capsule in the water phase.

In the method for preparing a polymer capsule according to the exemplary embodiment of the present invention, it is preferable that the surface-modification is performed using alkyl halide. That is, it is preferable that the copolymer capsule obtained in step a) is surface-modified using the alkyl halide as the surface-modifier.

The alkyl halide may change a thioether unit into a sulfonium group by partially alkylating the thioether unit existing in the copolymer capsule obtained in step a). Therefore, the sulfonium group having a positive charge may be formed on the surface of the copolymer capsule, and sulfur of the sulfonium group may voluntarily and strongly bind to the transition metal. That is, in the copolymer capsule surface-modified so that the sulfonium group is formed by the alkyl halide, a nucleation site of the transition metal may be provided by the sulfonium group, such that ultra-fine transition metal particles having an average diameter of 1.5 to 3.5 nm may be homogeneously loaded on the copolymer capsule at a uniform size, and as the transition metal of the transition metal particles is chemically bound to sulfur of the sulfonium group, the transition metal particles are strongly and stably attached to the copolymer capsule.

The alkyl halide may be, for example, (C1-C6)alkyl halide, but is not limited thereto. In more detail, the alkyl halide may be one or more selected from (C1-C6)alkyl chloride, (C1-C6)alkyl iodide, (C1-C6)alkyl bromide, and (C1-C6)alkyl fluoride. It is preferable that the alkyl halide is alkyl iodide so as to be capable of selectively alkylating thioether unit and allowing the surface of the polymer capsule to be positively charged to thereby improve water dispersibility and binding capacity to the transition metal. Further, alkyl of the alkyl halide may be (C1-C6)alkyl, preferably, (C1 to C4)alkyl, more preferably (C1-C2)alkyl, and most preferably, methyl. The reason is that the longer the alkyl, the lower the affinity to water, such that water dispersibility and stability of the modified polymer capsule may be deteriorated.

In detail, step b) may include b1) adding the surface-modifier to a dispersion in which the polymer capsule obtained in step a) is dispersed in alcohol and performing incubation; and b2) obtaining the water dispersion of the surface-modified polymer capsule by purification using dialysis. In this case, the alcohol may be (C1-C4) lower alcohol, and incubation may be performed for 0.5 to 2 days.

A significantly excessive amount of the surface-modifier may be added based on a total number of moles of the compound represented by Chemical Formula 1, that is, a total number of moles of the compound represented by Chemical Formula 1, used in step a). As a specific example, the amount of surface modifier may be 400 to 600 times based on the total number of moles of the compound represented by Chemical Formula 1. Further, as described above, the (C1-C6)alkyl halide, preferably, (C1-C6)alkyl iodide, and most preferably methyl iodide ($CH_3I$) is used as the surface-modifier, such that the thioether unit of the surface of the polymer capsule may be selectively and partially alkylated by a method of contacting the surface-modifier and the polymer capsule through a liquid matrix at room temperature for a long period of time.

Thereafter, the polymer capsule loaded with the transition metal nanoparticles may be prepared by sequentially adding the water-soluble transition metal precursor and the reducing agent to the water dispersion of the surface-modified polymer capsule obtained in step b).

It is preferable that the water-soluble transition metal precursor added to the water dispersion of the surface-modified polymer capsule is a precursor containing a transition metal anion among cations and anions formed by dissociation of transition metal precursors in water. Therefore, supply of the material may be smoothly performed as described above, and the transition metal nanoparticles may be selectively formed on the surface-modified polymer capsule. In detail, it is preferable that the water-soluble transition metal precursor is alkali metal-transition metal halide. An alkali metal of the alkali metal-transition metal halide may be one or more selected from sodium, potassium, and lithium. The alkali metal-transition metal halide may be one or more selected from chloride, iodide, bromide, and fluoride. A transition metal of the alkali metal-transition metal halide may be a transition metal to be loaded on the copolymer capsule. As a specific example, the transition metal may be one or more selected from Au, Ag, Pd, and Pt.

An average size of the transition metal nanoparticles loaded and bound to the polymer capsule may be adjusted by an addition amount of the water-soluble transition metal precursor added to the water dispersion of the surface-modified polymer capsule. Here, in the case in which an excessive amount of the water-soluble transition metal precursor is added to the water dispersion, there is a risk that the polymer capsules will be aggregated with each other by a reduced transition metal or a coating layer of the transition metal instead of independent particles will be formed. Therefore, it is preferable that the number of moles of the water-soluble transition metal precursor added to the water dispersion of the surface-modified polymer capsule is 1 to 4 times based on the total number of moles of the compound represented by Chemical Formula 1 in step a).

As described above, the ultra-fine monocrystalline transition metal particles having a significantly uniform size may be bound to the polymer capsule by adding the water-soluble transition metal precursor so as to satisfy the above-mentioned molar ratio and sequentially adding the reducing agent while providing the nucleation site of the transition metal by surface-modifying the surface of the polymer capsule so as to have the positive zeta potential using the alkyl halide, preferably, alkyl iodide, and most preferably, methyl iodide as the surface-modifier and forming the sulfonium group on the surface.

It is preferable that the reducing agent added to the water dispersion of the surface-modified polymer capsule is a strong reducing agent capable of rapidly reducing the water-soluble transition metal precursor without affecting the polymer capsule. The reason is that in the case in which reducing power is strong, ultra-fine transition metal particles may be homogeneously formed using the sulfonium group as the nucleation site. In view of providing strong reducing power without damaging the polymer capsule, it is preferable that the reducing agent is $NaBH_4$, $NaOH$, or a mixture thereof.

An amount of the reducing agent is not limited as long as the reducing agent may sufficiently reduce the added water-soluble transition metal precursor. As a specific example, 1 to 20 moles of the reducing agent, preferably, 1 to 20 moles of $NaBH_4$, $NaOH$, or the mixture thereof may be added based on 1 mole of the water-soluble transition metal precursor. It is preferable that the reducing agent is added after an ion layer of the transition metal halide anion is formed on a surface region of the polymer capsule positively charged by dissolution of the water-soluble transition metal precursor, preferably, the alkali metal-transition metal halide. As a non-restrictive and specific example, the reducing agent may be added after 1 to 8 hours from dissolution of the water-soluble transition metal precursor. After adding the reducing agent, room-temperature incubation may be performed for 3 to 8 hours, and then, the polymer capsule loaded with the metal particles may be purified using dialysis.

Inventive Example

Preparation of Polymer Capsule

[Chemical Formula 3]

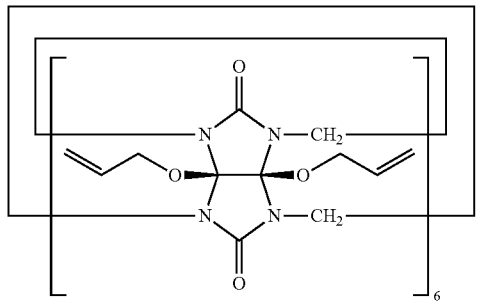

43.7 mg (240 μmol) of 3,6-dioxa-1,8-octanedithiol was added to and dissolved in a solution in which 10.4 mg (5.0 μmol) of allyloxy cucurbit[6]uril (compound represented by Chemical Formula 3) was dissolved in methanol (10 ml). After performing nitrogen purging, a polymer capsule dispersed in methanol was prepared by applying UV light with wavelengths of 254 nm and 300 nm for 10 hours and then removing residues by dialysis (Thermo SnakeSkin Pleated Dialysis Tubing, MWCO: 10,000). Then, a total of 19.8 mg of a polymer capsule was prepared by volatilizing and removing methanol.

As a result of dropping a drop of the polymer capsule dispersed in methanol on a planar substrate, drying the drop, and then observing the formed product using a transmission electron microscope, it was confirmed that the polymer capsule has a capsule shape, and as a result of measuring a diameter of the prepared polymer capsule using a dynamic light scattering device (DLS-7000, Otsuka Electronics), it was confirmed that a polymer capsule having an average diameter of 100 nm was prepared.

As a result of measuring a zeta potential (Zetasizer Nano ZS instrument, Malvern) after dispersing the dried polymer capsule (19.8 mg) in 10 ml of water, it was confirmed that the polymer capsule had a zeta potential of −13.8±8.7 mV.

Elemental analysis result of the polymer capsule using elemental analyzer: Calculation value $[(C_{72}H_{96}N_{24}O_{24})(C_6H_{12}O_2S_2)_{9.8}(CH_4O)_3(H_2O)_5]_n$: C, 44.22; H, 6.53; N, 9.25; S, 17.28; Measured value: C, 43.88; H, 6.02; N, 9.19; S, 17.16.

Preparation of Surface-Modified Polymer Capsule

After a total of 19.8 mg of the synthesized polymer capsule was re-dispersed in 10 ml of methanol, 2.4 mmol of $CH_3I$ corresponding to a surface-modifier was added thereto. After incubation at room temperature for one day, 10 ml of a water dispersion of a total of 22.1 mg of a surface-modified polymer capsule was obtained by purification using dialysis.

Elemental analysis result of the surface-modified polymer capsule using elemental analyzer: calculation value $[(C_{72}HτN_{24}O_{24})(C_6H_{12}O_2S_2)_{9.3}(CH_3I)_6(H_2O)_{5.5}]_n$: C, 37.34; H, 5.54; N, 7.80; S, 13.89; measured value: C, 37.58; H, 5.38; N, 7.58; S, 13.51.

As a result of measuring a zeta potential (Zetasizer Nano ZS instrument, Malvern) after dispersing the surface-modified polymer capsule (19.8 mg) in 10 ml of water, it was confirmed that the surface-modified polymer capsule had a zeta potential of 72.9±10.0 mV. It may be appreciated through the elemental analysis and the zeta potential that thioether existing on a surface of the polymer capsule was changed into a sulfonium group by $CH_3I$.

FIGS. 1A to 1E are views illustrating particle size distribution, scanning electron microscope photographs, and transmission electron microscope photographs of a surface-modified polymer capsule. In detail, FIG. 1A illustrates results of measuring particle size distribution of the polymer capsule (reference numeral 1 in FIG. 1A) synthesized by photopolymerization and the surface-modified polymer capsule (reference number 2 in FIG. 1A) using the dynamic light scattering device (DLS-7000, Otsuka Electronics). It may be appreciated that in the case of the surface-modified polymer capsule, water dispersibility was stably maintained even after 1 month.

Figure 1B:
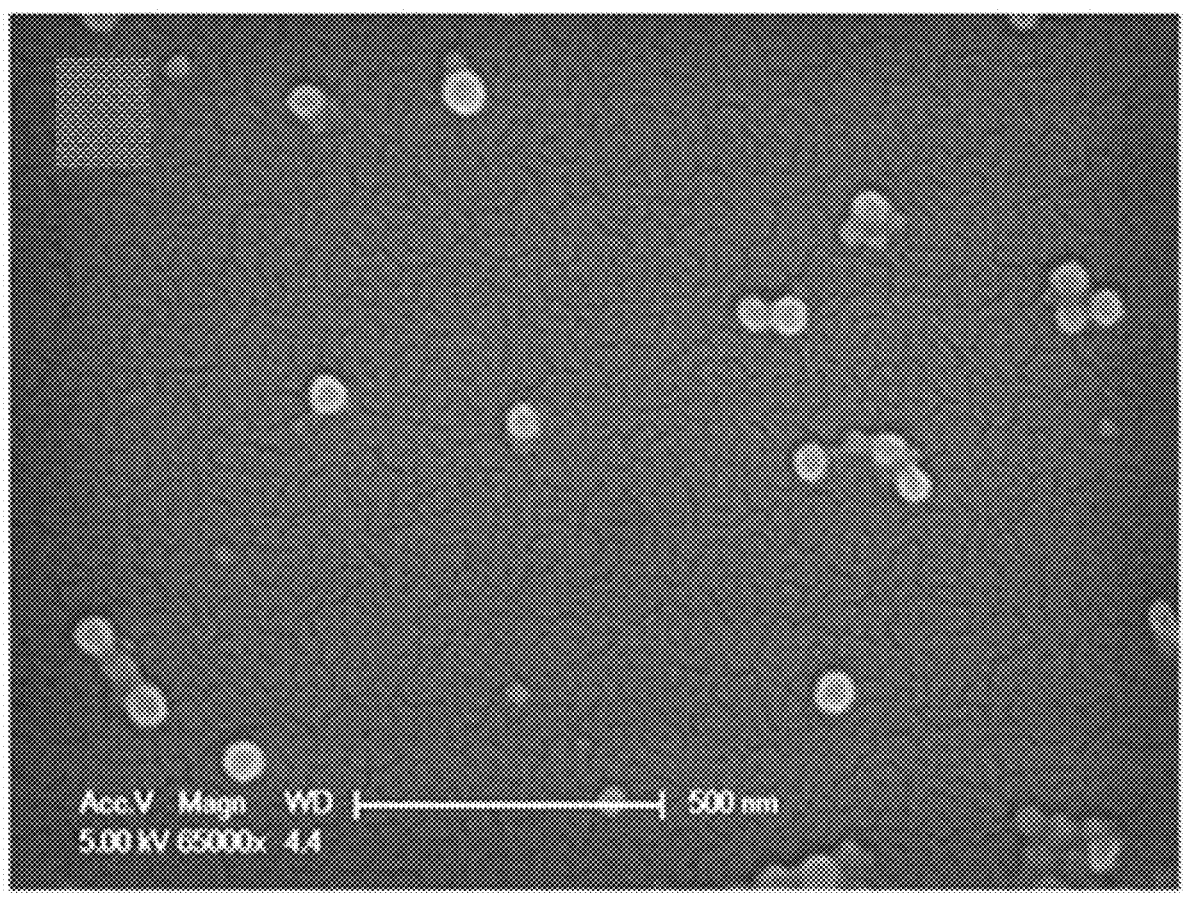
FIGS. 1B and 1C are views illustrating scanning electron microscope photographs.
Figure 1C:
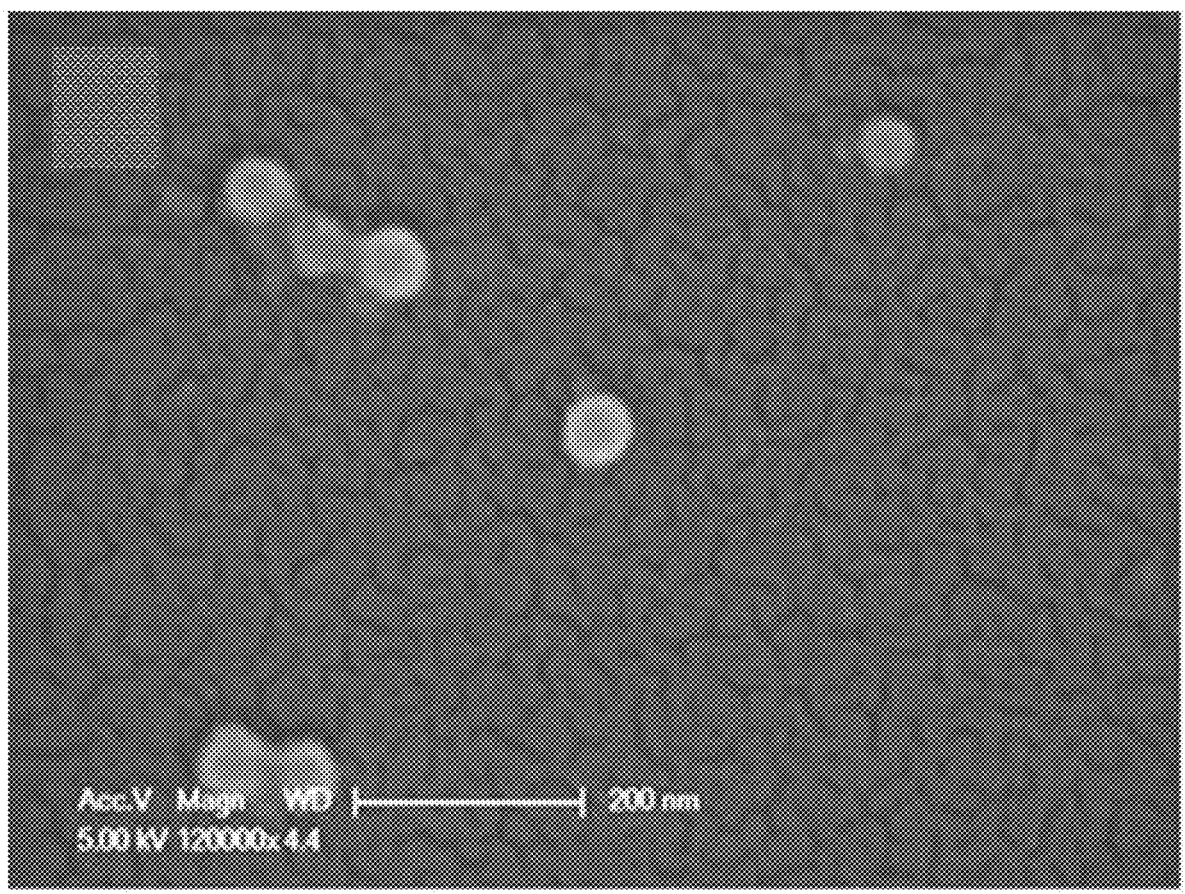
Figure 1D:
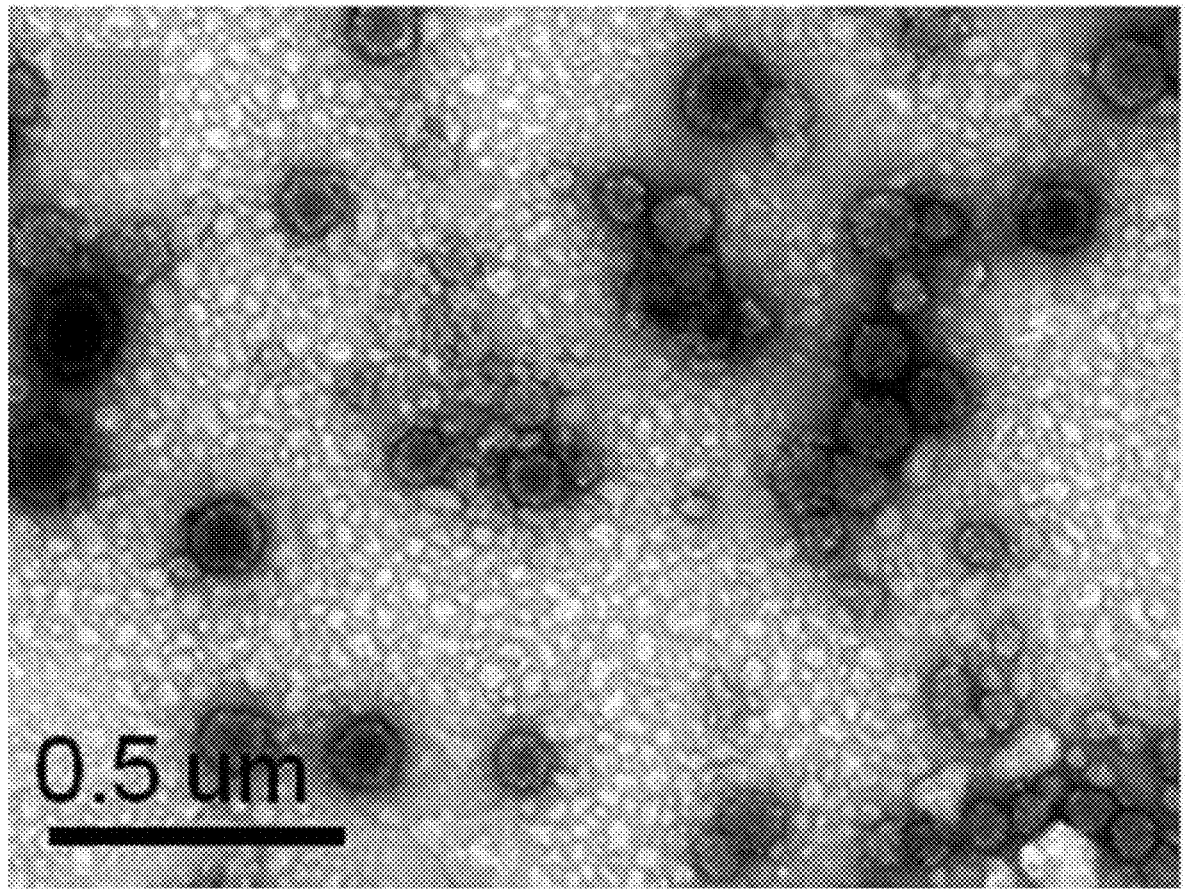
FIGS. 1D and 1E are views illustrating transmission electron microscope photographs of a surface-modified polymer capsule. In detail.
Figure 1E:
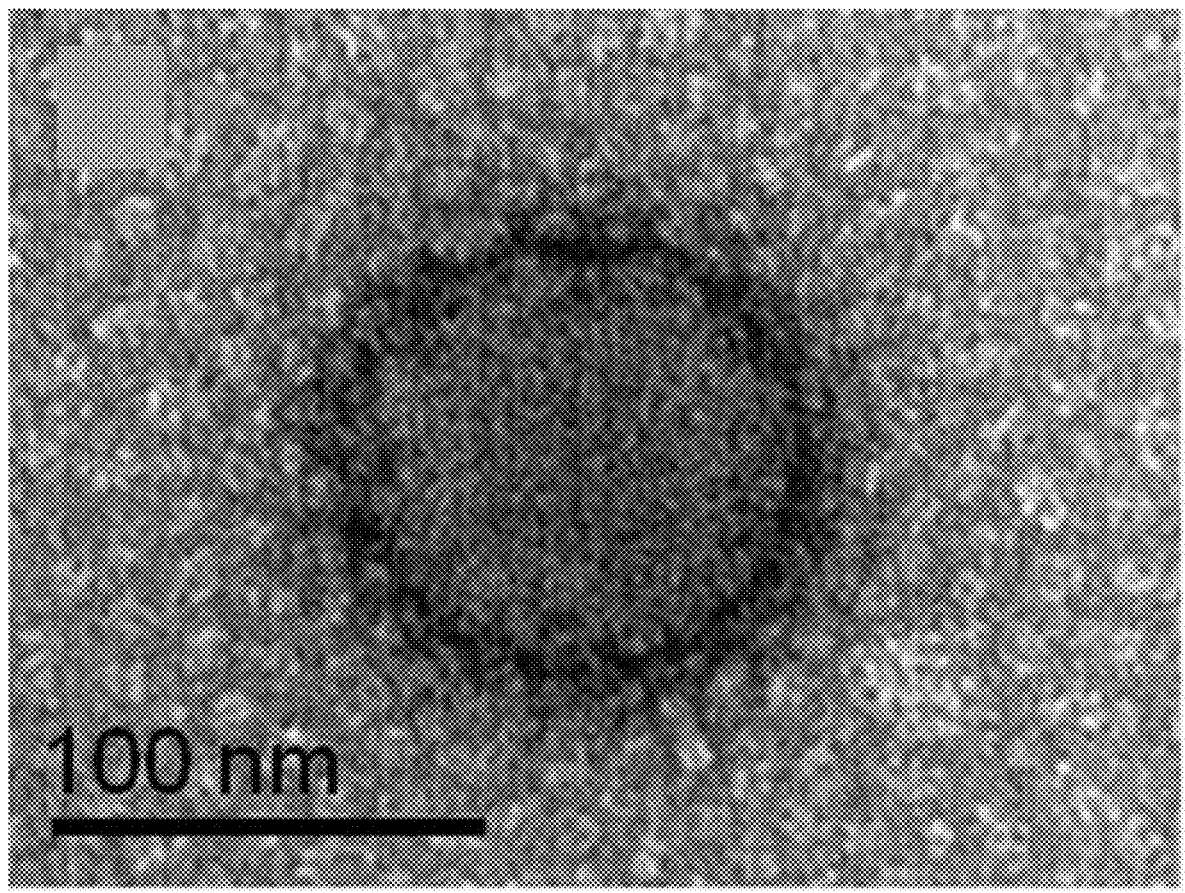

FIGS. 1B and 1C are scanning electron microscope photographs of the surface-modified polymer capsule and FIGS. 1D and 1E are transmission electron microscope photographs of the surface-modified polymer capsule. Transmission electron microscope (TEM) observation was performed after dyeing with uranyl acetate. As illustrated in FIGS. 1B to 1E, it may be confirmed that even after surface-modification of the polymer capsule, the shape or size thereof was maintained as it is in a state in which the polymer capsule was synthesized.

Preparation of Polymer Capsule Loaded with Pd Nanoparticles

An aqueous $K_2PdCl_4$ solution was added to 0.5 ml of a water dispersion (containing 0.25 µmol of allyloxy cucurbit[6]uril) in which 1.1 mg of the surface-modified polymer capsule was dispersed in water so that 0.75 µmol of $K_2PdCl_4$ was added thereto, and incubated at room temperature for 3 hours. Thereafter, an aqueous $NaBH_4$ solution was added to the water dispersion so that 12 µmol of $NaBH_4$ was added thereto, and incubated again at room temperature for 5 hours, followed by dialysis, thereby preparing a polymer capsule loaded with Pd nanoparticles.

Here, as a result of measuring a zeta potential of the polymer capsule dispersed in water before adding a reducing agent after adding the aqueous $K_2PdCl_4$ solution to the water-dispersion, it was confirmed that the zeta potential was decreased to 48.4±7.0 mV.

Preparation of Polymer Capsule Loaded with Au Nanoparticles

An aqueous $KAuCl_4$ solution was added to 0.5 ml of a water dispersion (containing 0.25 µmol of allyloxy cucurbit[6]uril) in which 1.1 mg of the surface-modified polymer capsule was dispersed in water so that 0.25 µmol of $KAuCl_4$ was added thereto, and incubated at room temperature for 3 hours. Thereafter, an aqueous NaOH solution was added to the water dispersion so that 4 µmol NaOH was added thereto, and incubated again at room temperature for 5 hours, followed by dialysis, thereby preparing a polymer capsule loaded with Au nanoparticles.

Preparation of Polymer Capsule Loaded with Pt Nanoparticles

An aqueous $K_2PtCl_4$ solution was added to 0.5 ml of a water dispersion (containing 0.25 µmol of allyloxy cucurbit[6]uril) in which 1.1 mg of the surface-modified polymer capsule was dispersed in water so that 0.5 µmol $K_2PtCl_4$ was added thereto, and incubated at room temperature for 3 hours. Thereafter, an aqueous $NaBH_4$ solution was added to the water dispersion so that 8 µmol $NaBH_4$ was added thereto, and incubated again at room temperature for 5 hours, followed by dialysis, thereby preparing a polymer capsule loaded with Pt nanoparticles.

Figure 2:
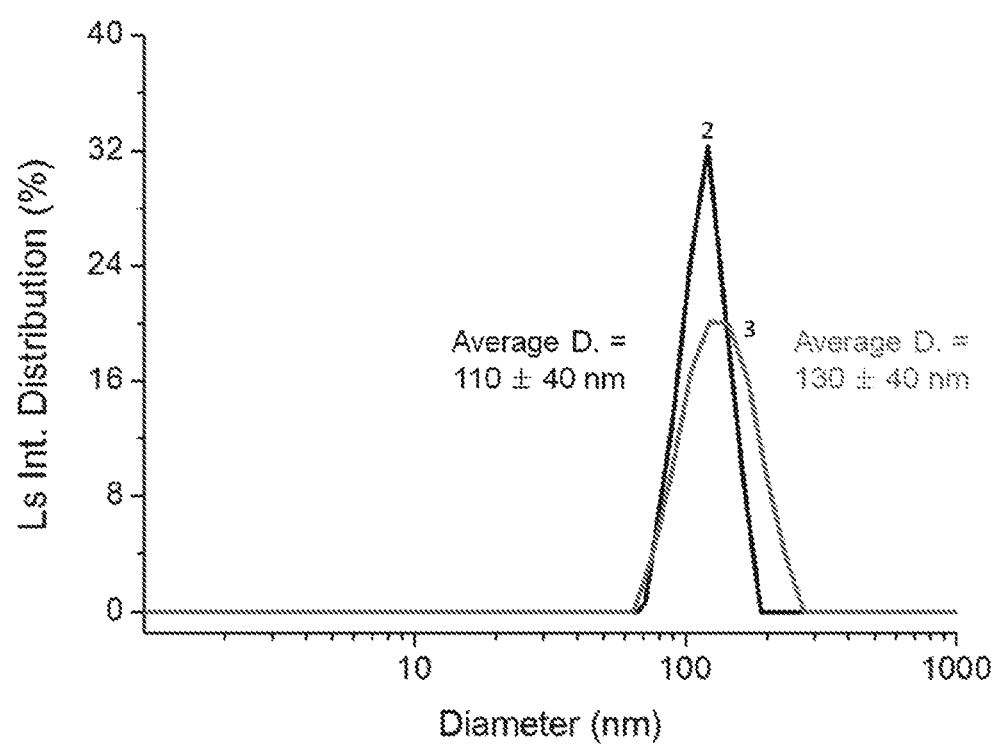
FIG. 2 is a view illustrating a result obtained by measuring particle size distribution of a surface-modified polymer capsule (indicated by reference numeral 2 in FIG. 2) and a polymer capsule loaded with Pd nanoparticles (indicated by reference numeral 3 in FIG. 2) using a dynamic light scattering device (DLS-7000, Otsuka Electronics).

FIG. 2 is a view illustrating a result obtained by measuring particle size distribution of the surface-modified polymer capsule (indicated by reference numeral 2 in FIG. 2) and the polymer capsule loaded with Pd nanoparticles (indicated by reference numeral 3 in FIG. 2) using a dynamic light scattering device (DLS-7000, Otsuka Electronics). It may be appreciated that after loading the Pd nanoparticles, a polymer capsule having an average diameter of 130 nm was formed.

Figure 3A:
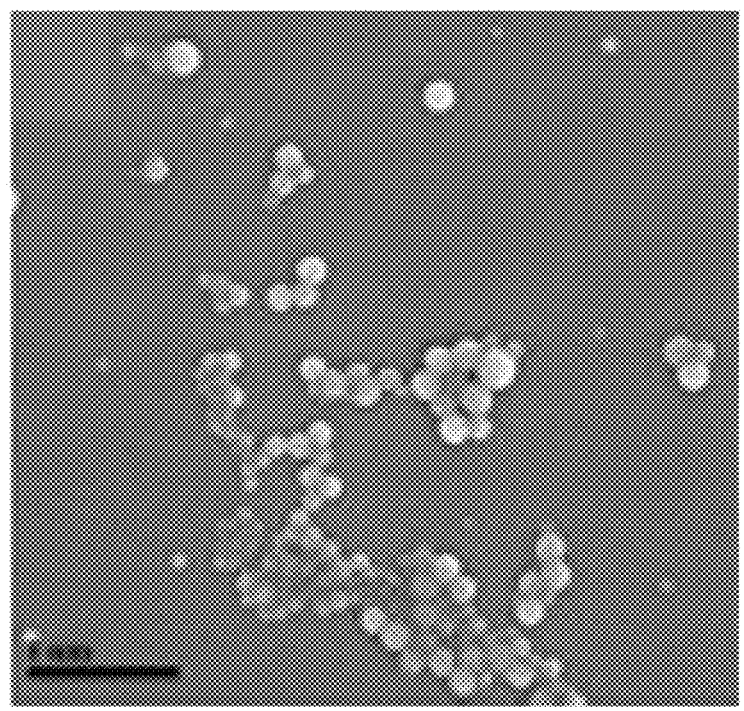
FIGS. 3A and 3D are scanning electron microscope (SEM) photographs of a polymer capsule loaded with Pd nanoparticles.
Figure 3B:
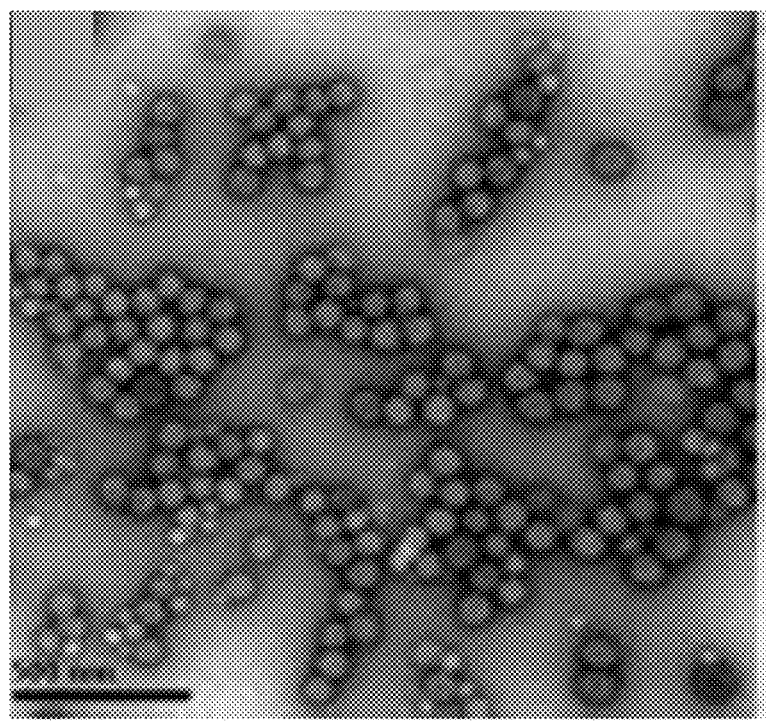
FIGS. 3B and 3E are transmission electron microscope (TEM) photographs thereof after dyeing with uranyl acetate.
Figure 3C:
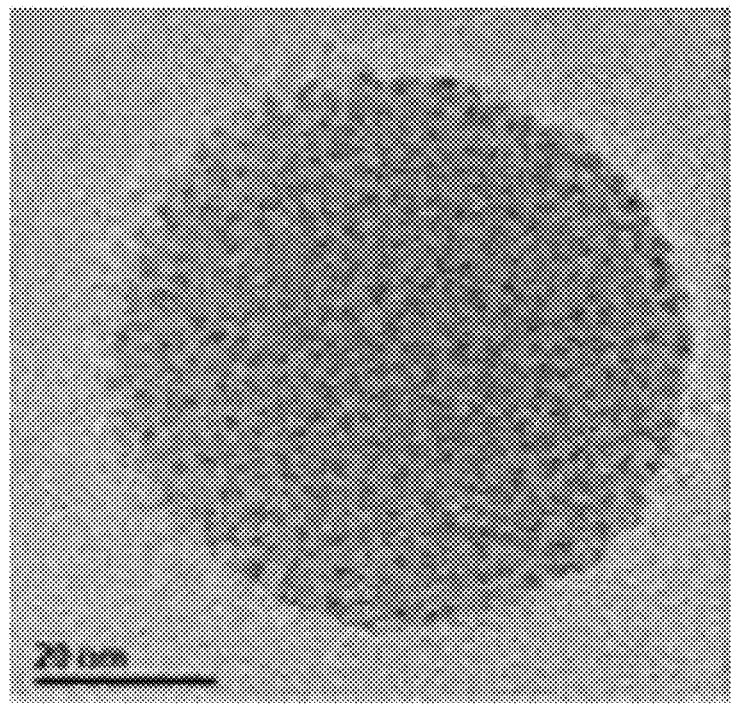
FIGS. 3C and 3F are high-magnification TEM photographs thereof.
Figure 3D:
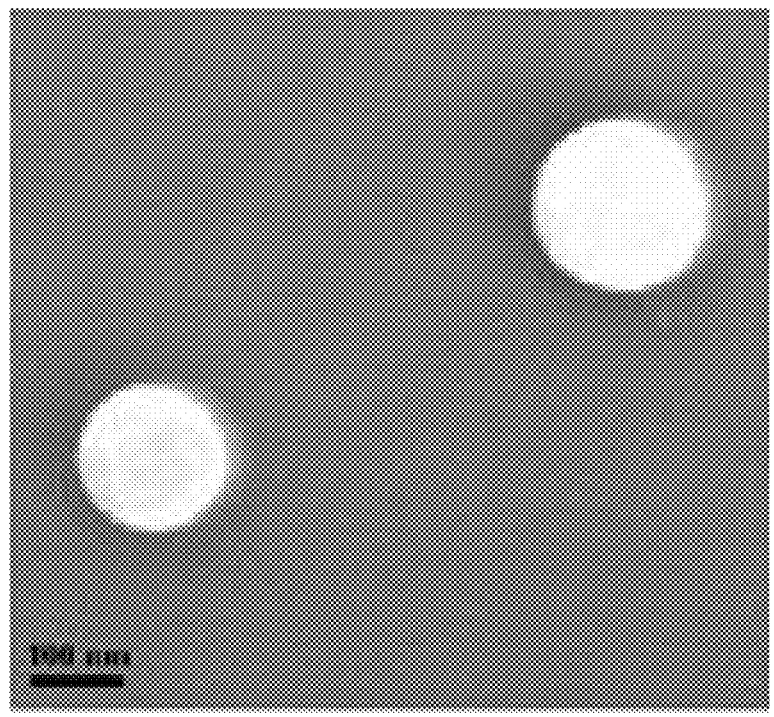
Figure 3E:
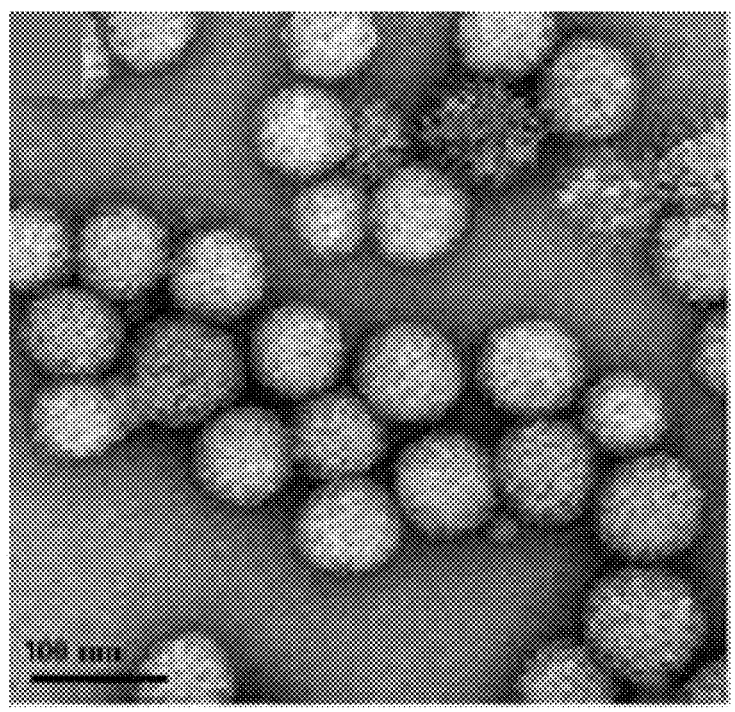
Figure 3F:
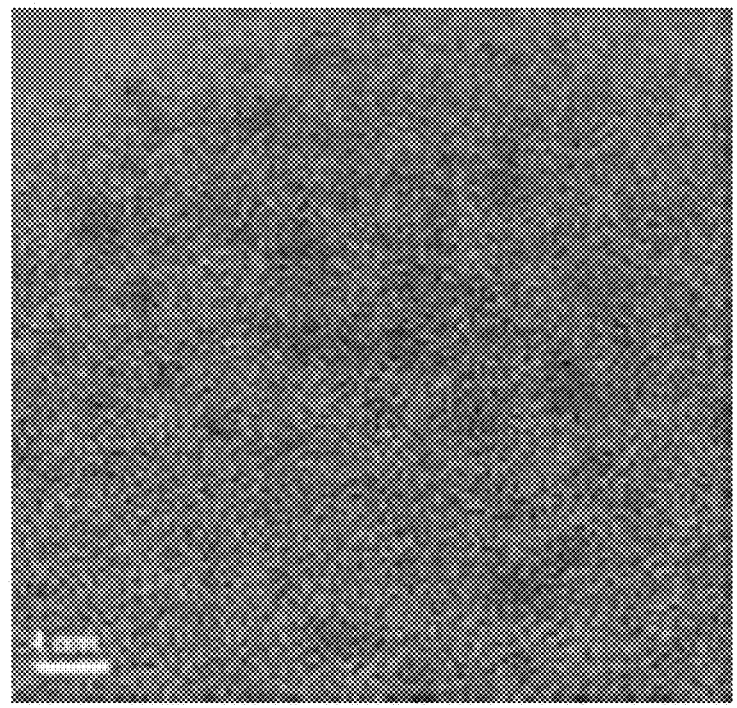

FIGS. 3A and 3D are scanning electron microscope photographs of a polymer capsule loaded with pd nanoparticles, FIGS. 3B and 3E are transmission electron microscope photographs thereof after dyeing with uranyl acetate, and FIGS. 3C and 3F are high-magnification transmission electron microscope photographs.

As illustrated in FIGS. 3A to 3F, it may be appreciated that the polymer capsule loaded with the transition metal nanoparticles maintained a spherical capsule shape, and ultra-fine and uniform Pd nanoparticles were uniformly and homogeneously loaded on the surface of the polymer capsule. As a result of transmission electron microscope observation, it was confirmed that the Pd nanoparticles had a significantly uniform size of 1.9±0.2 nm, and as a result of inductively coupled plasma atomic emission spectroscopy (ICP-AES) analysis, it was confirmed that 81% of Pd in the added $K_2PdCl_4$ was loaded as the Pd nanoparticles.

Further, it was confirmed that water dispersibility of the prepared polymer capsule loaded with the transition metal nanoparticles was not deteriorated even after 6 months from a preparation time point.

Figure 4A:
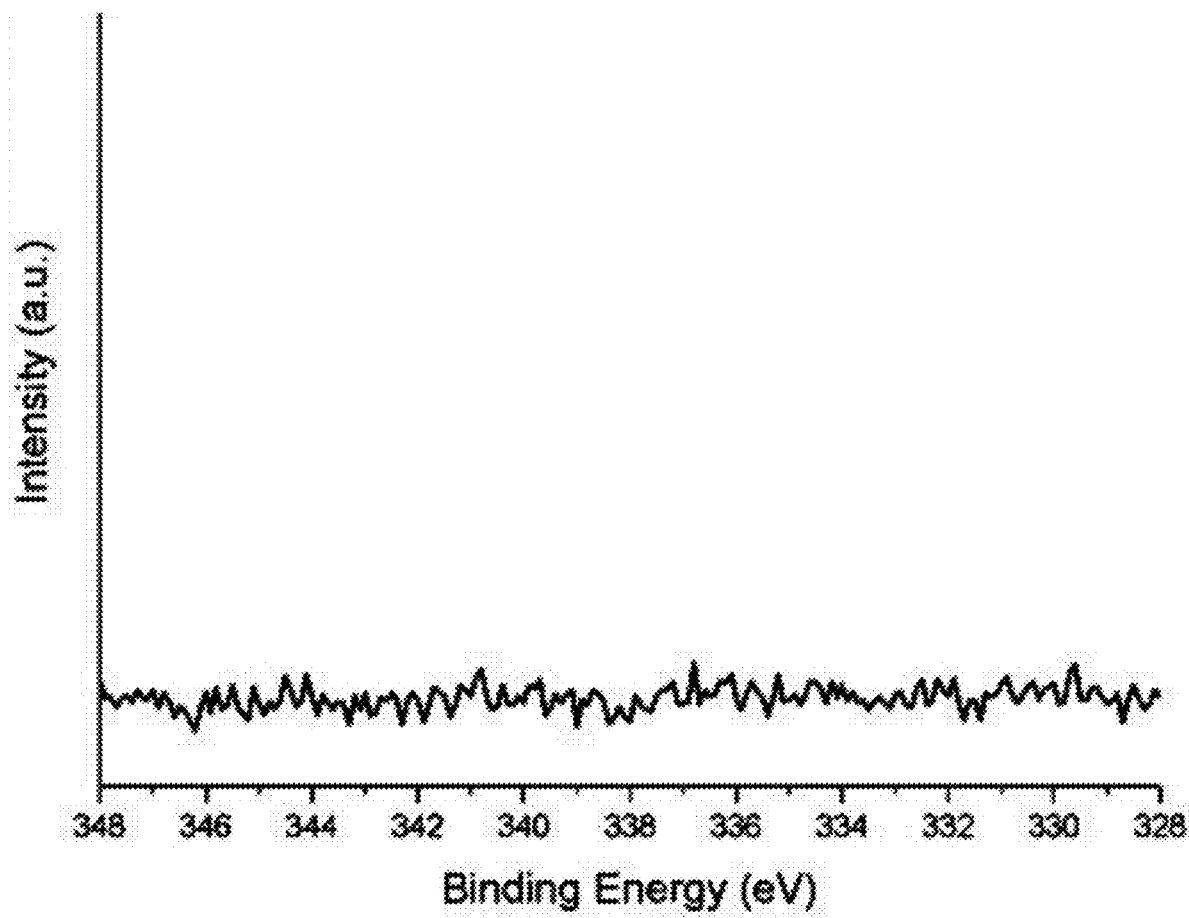
FIGS. 4A to 4C are views illustrating X-ray photoelectron spectroscopy (XPS) results of a surface-modified polymer capsule.
Figure 4B:
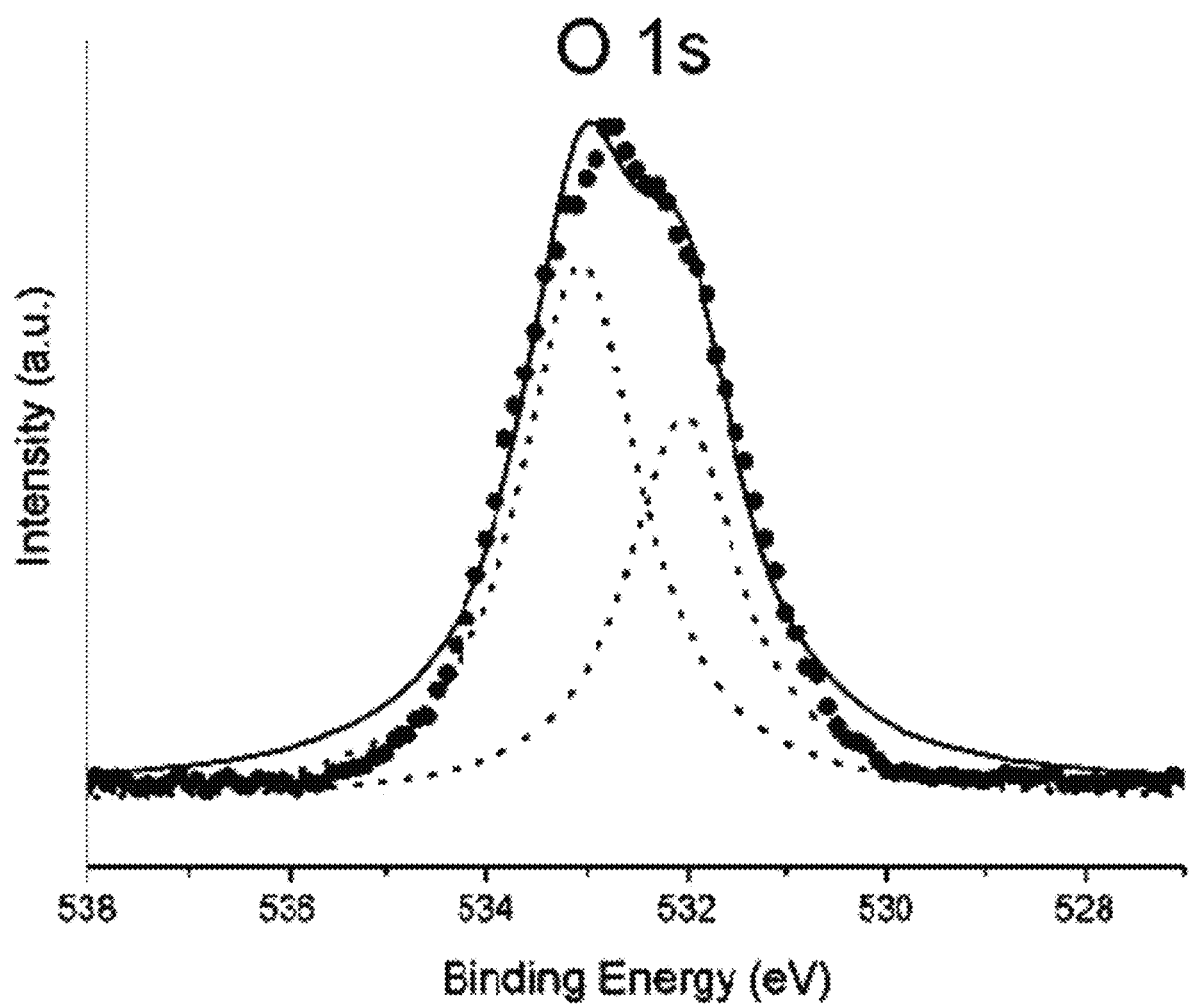
Figure 4C:
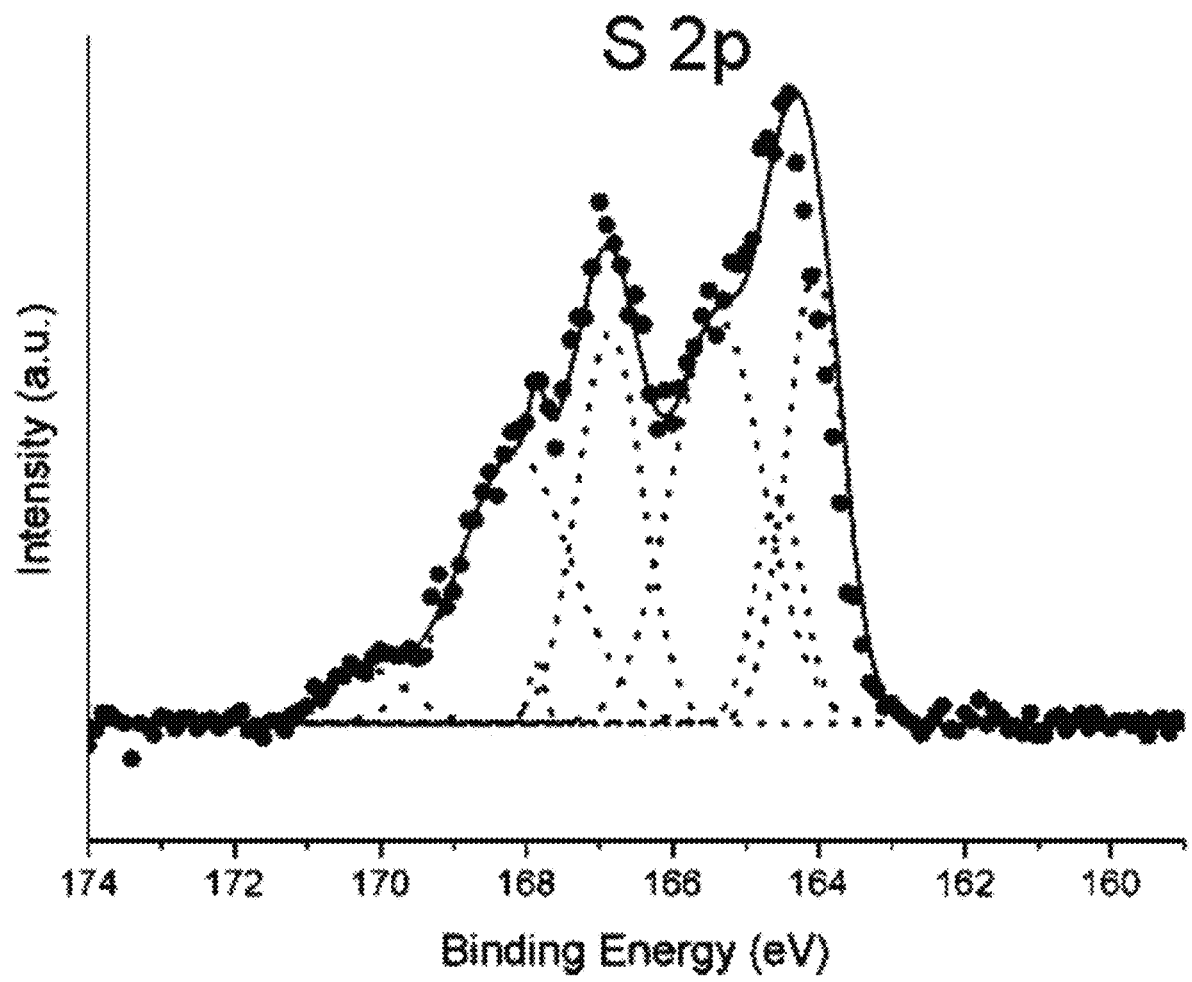
Figure 4D:
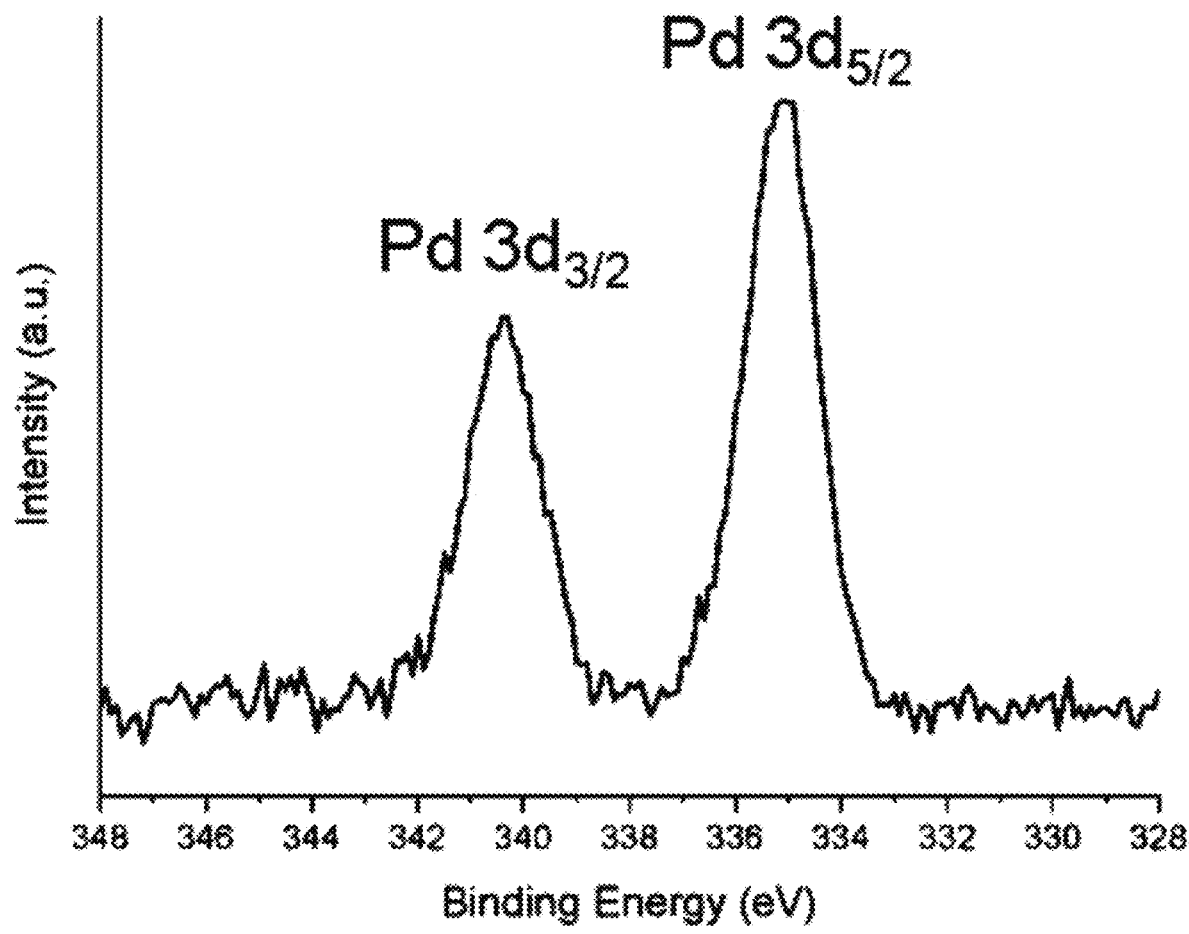
FIGS. 4D to 4F are views illustrating XPS results of a polymer capsule loaded with Pd nanoparticles.
Figure 4E:
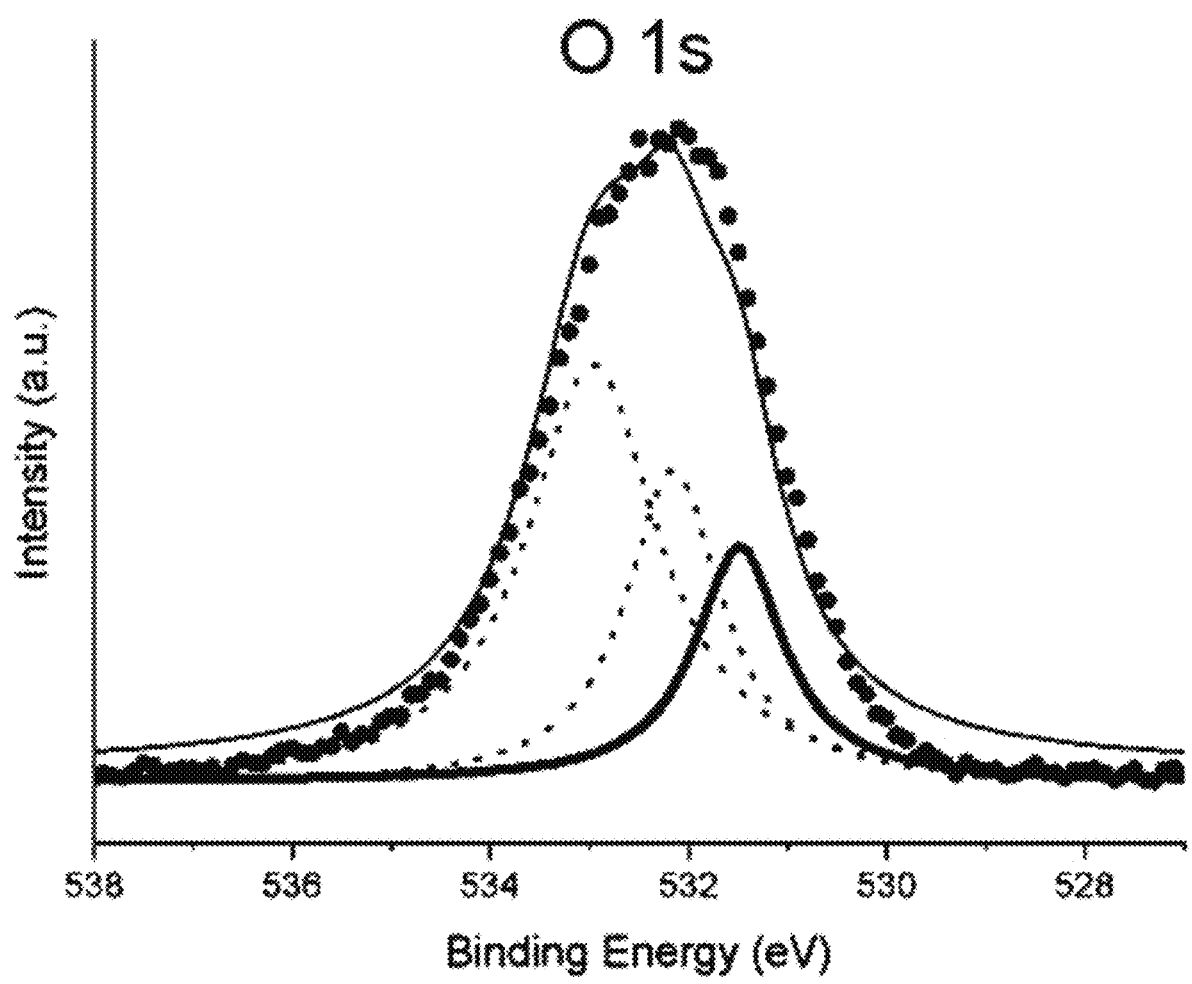
Figure 4F:
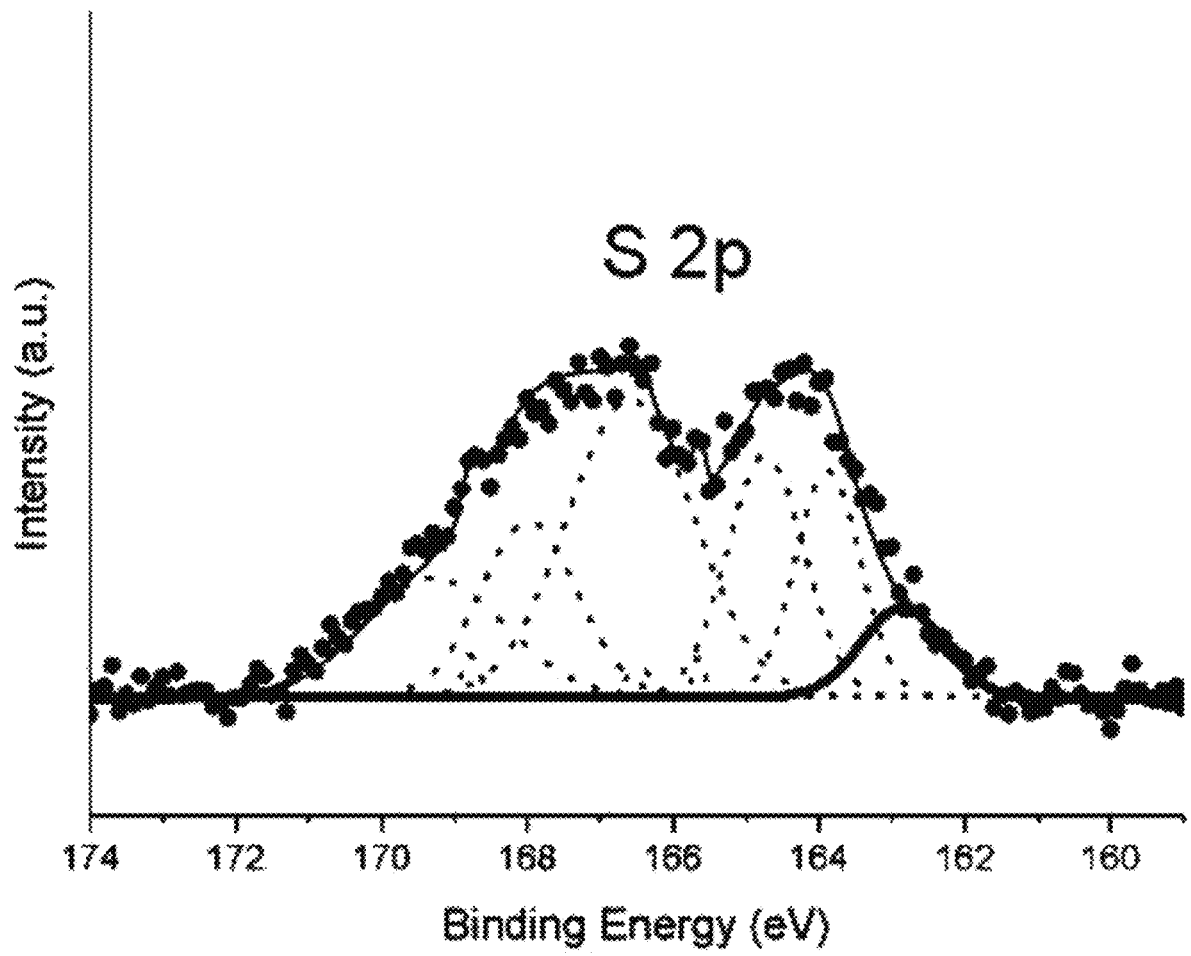

FIGS. 4A to 4C are views illustrating X-ray photoelectron spectroscopy (XPS) results of the surface-modified polymer capsule, and FIGS. 4D to 4F are views illustrating XPS results of the polymer capsule loaded with Pd nanoparticles. It may also be appreciated from the XPS results in FIGS. 4A to 4F that the Pd nanoparticles were loaded on the polymer capsule, and it may be appreciated that in the polymer capsule loaded with the Pd nanoparticles, an oxygen (is) peak shifted to a long wavelength, and a new sulfur (2p) peak of 162.8 eV appeared. Therefore, it may be appreciated that carbonyl oxygen interacted with the Pd nanoparticles, and a Pd—S bond was formed.

Figure 5:
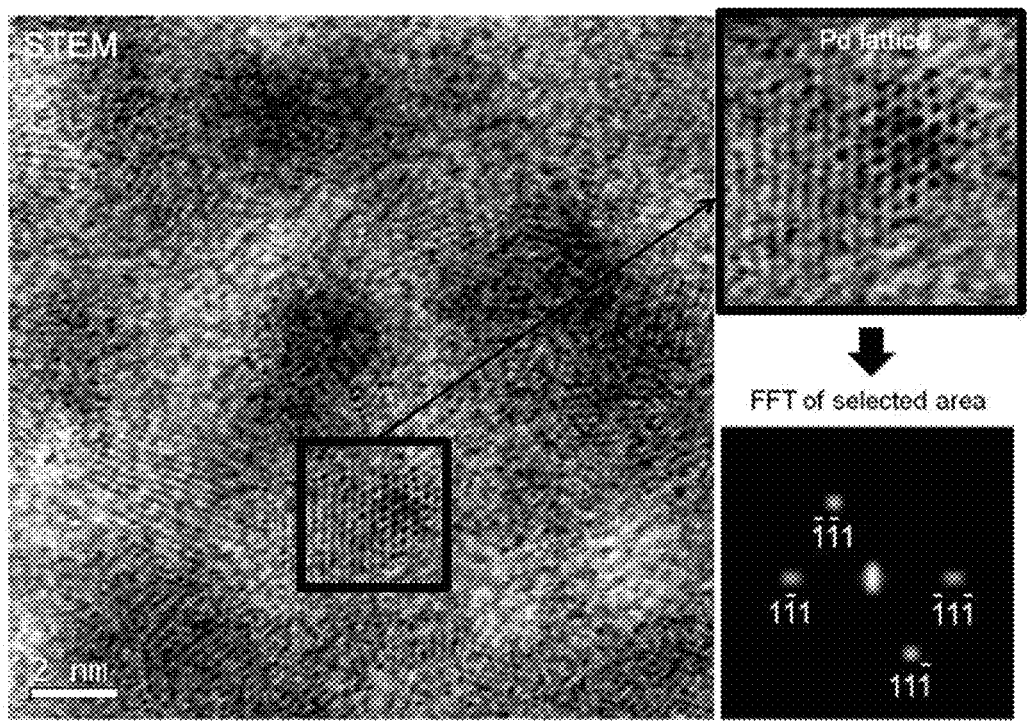
FIG. 5 is a view illustrating a scanning TEM image of the polymer capsule loaded with Pd nanoparticles and a fast Fourier transform (FFT) pattern of the Pd nanoparticles.

FIG. 5 is a view illustrating a scanning transmission electron microscope (STEM) image of the polymer capsule loaded with Pd nanoparticles and a fast Fourier transform (FFT) pattern of the Pd nanoparticles. As a result of the observation, it was confirmed that all of the Pd nanoparticles loaded on the polymer capsule were monocrystalline particles having a (111) face centered cubic (FCC) structure.

Figure 6:
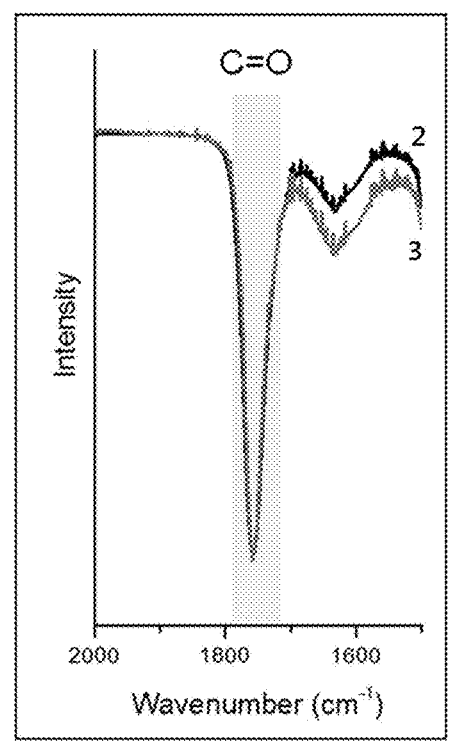
FIG. 6 is a view illustrating a result obtained by observing C=O stretching vibration peaks of a surface-modified polymer capsule (2 of FIG. 6) and a polymer capsule (3 of FIG. 6) loaded with Pd nanoparticles using Fourier transform infrared spectroscopy (FT-IR).

As a result obtained by observing C=O stretching vibration peaks of the surface-modified polymer capsule (black color of FIG. 6) and the polymer capsule (red color of FIG. 6) loaded with Pd nanoparticles using Fourier transform infrared spectroscopy (FT-IR), it was confirmed that there was no significant shift as illustrated in FIG. 6.

Figure 7A:
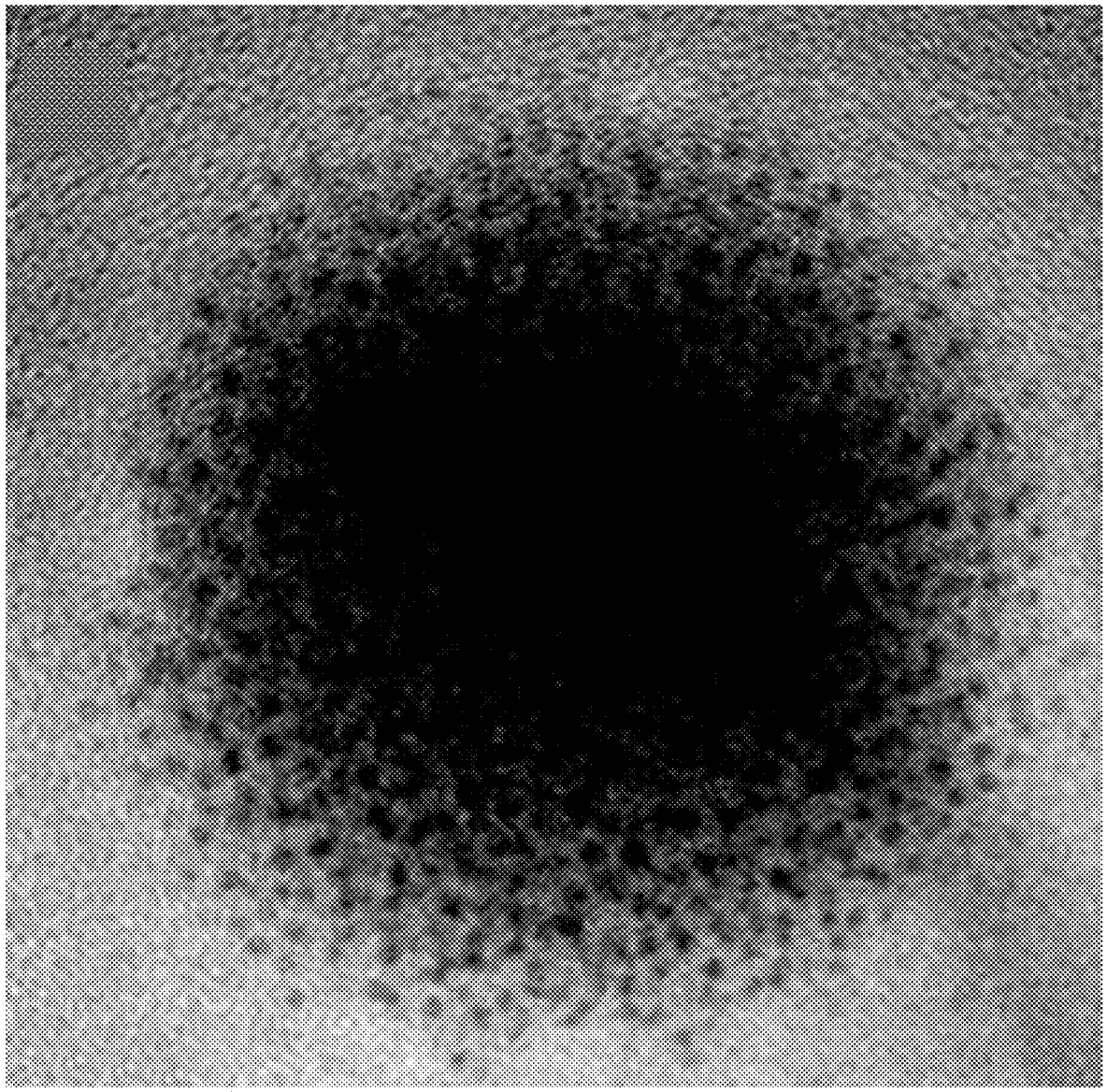
FIGS. 7A to 7C are high-magnification TEM photographs of polymer capsules loaded with Pd nanoparticles.
Figure 7B:
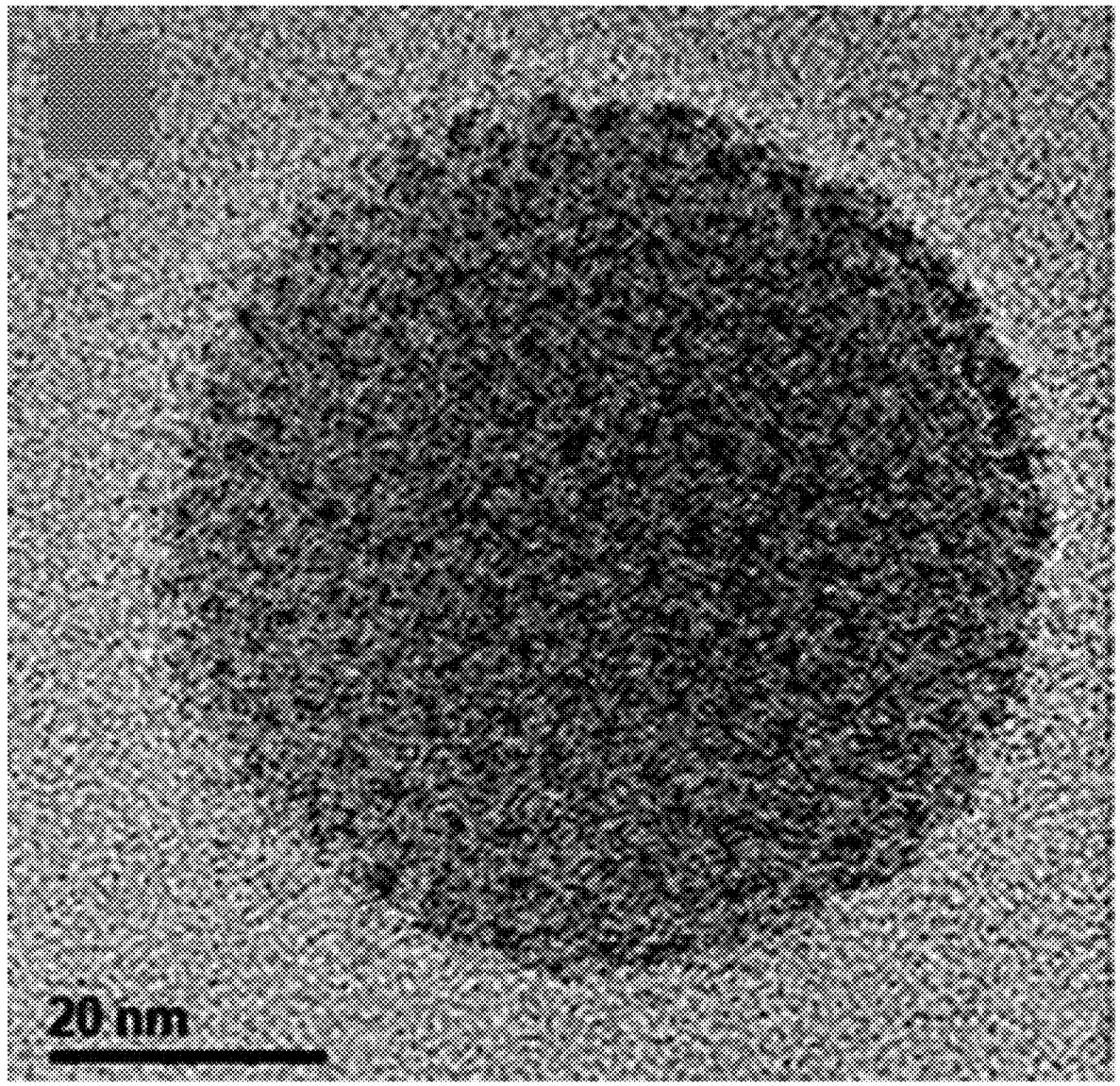
Figure 7C:
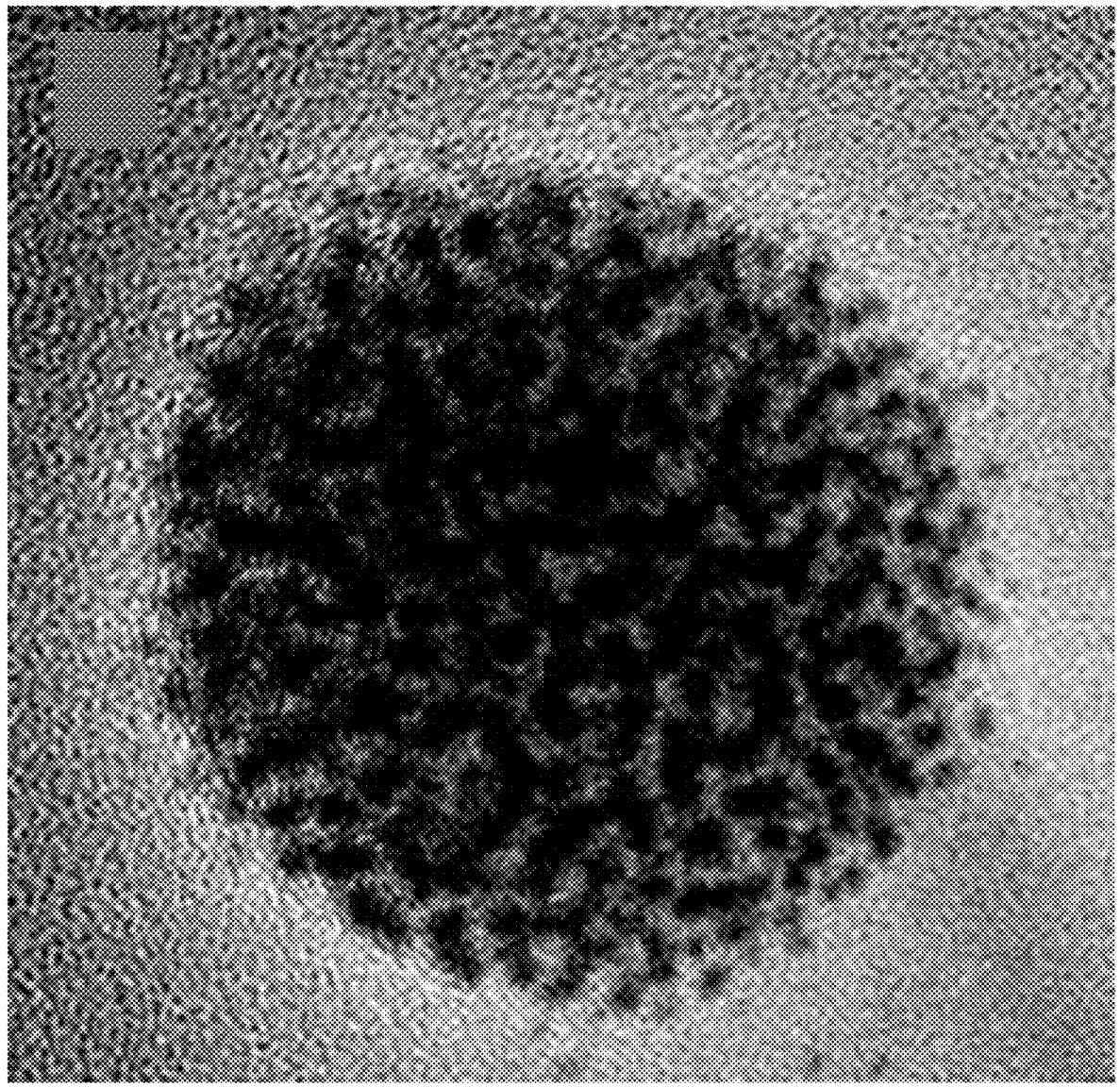
Figure 7D:
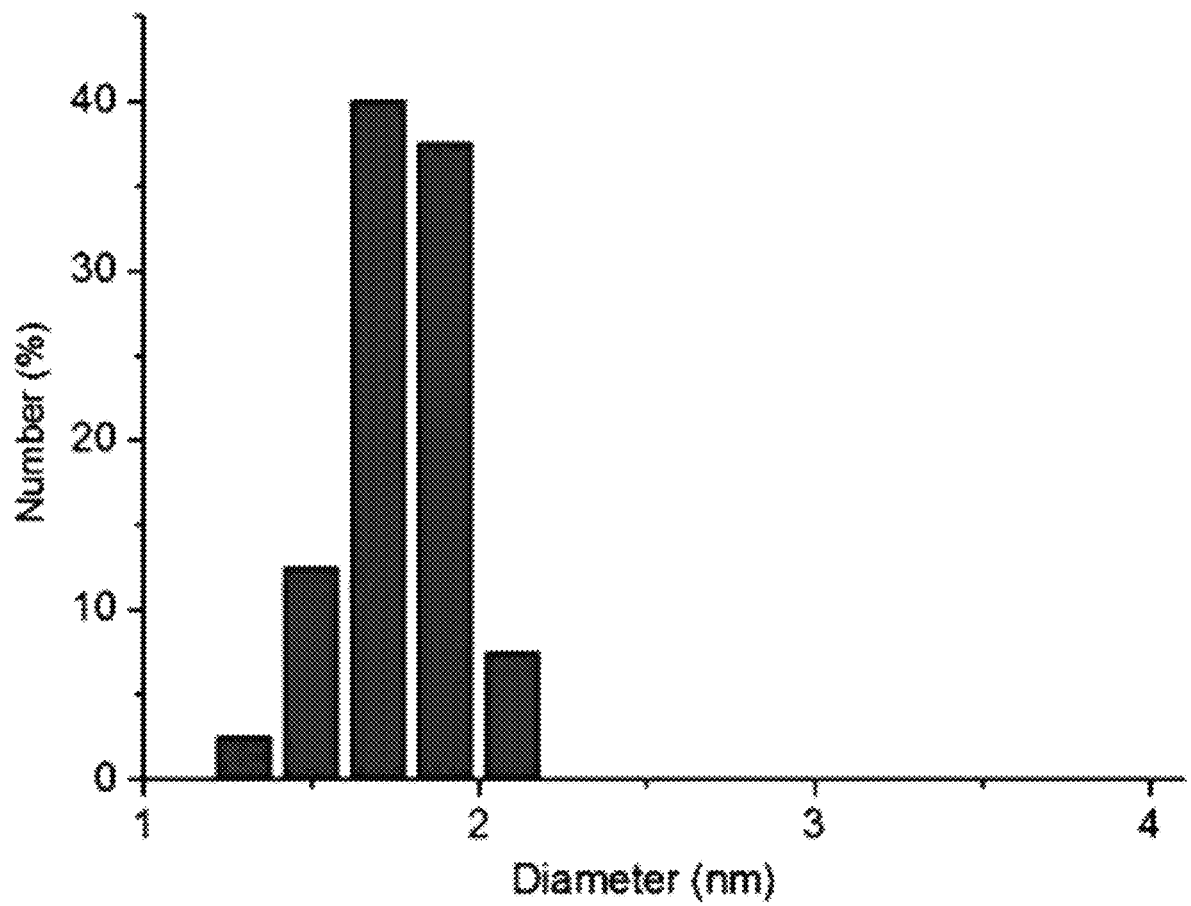
FIGS. 7D to 7F are views illustrating results obtained by measuring diameters of the loaded Pd nanoparticles.
Figure 7E:
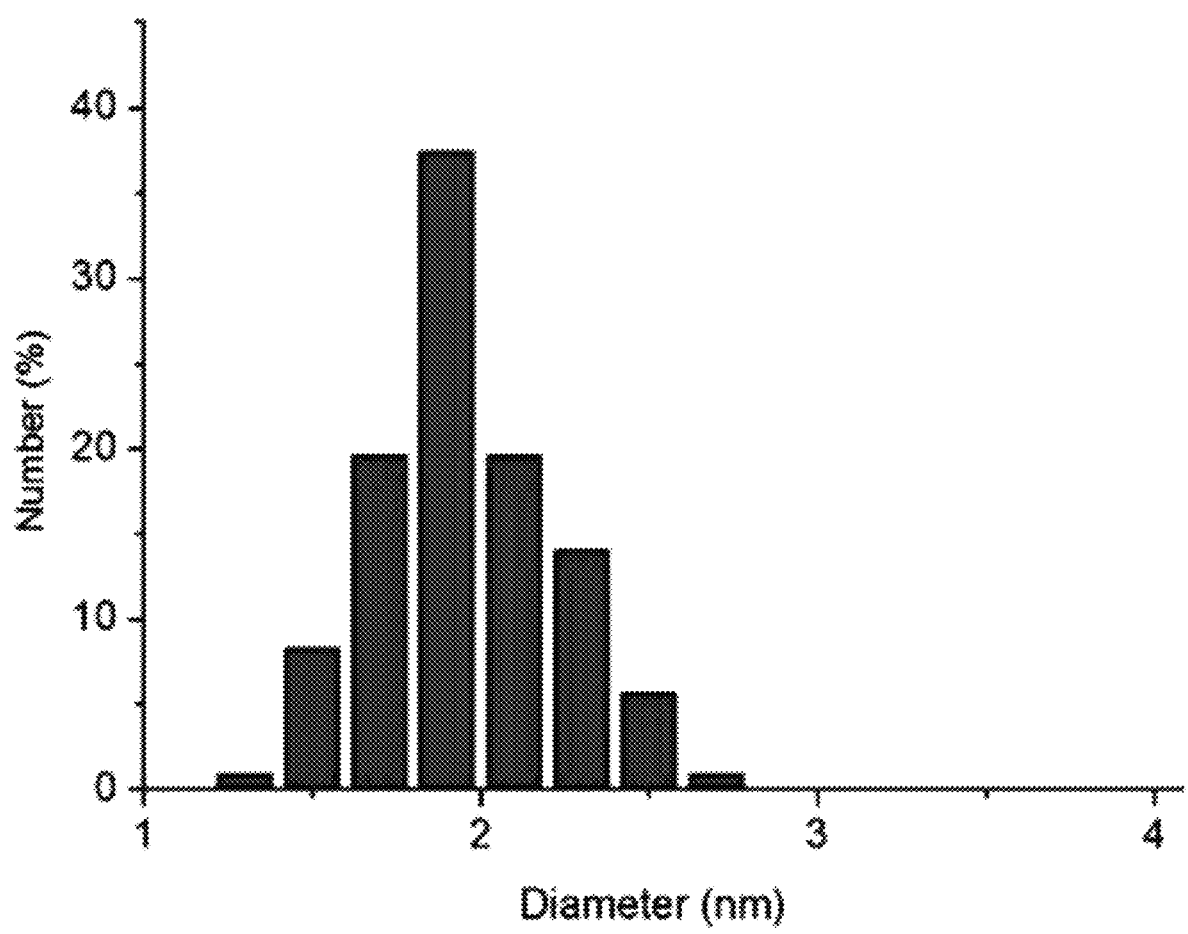
Figure 7F:
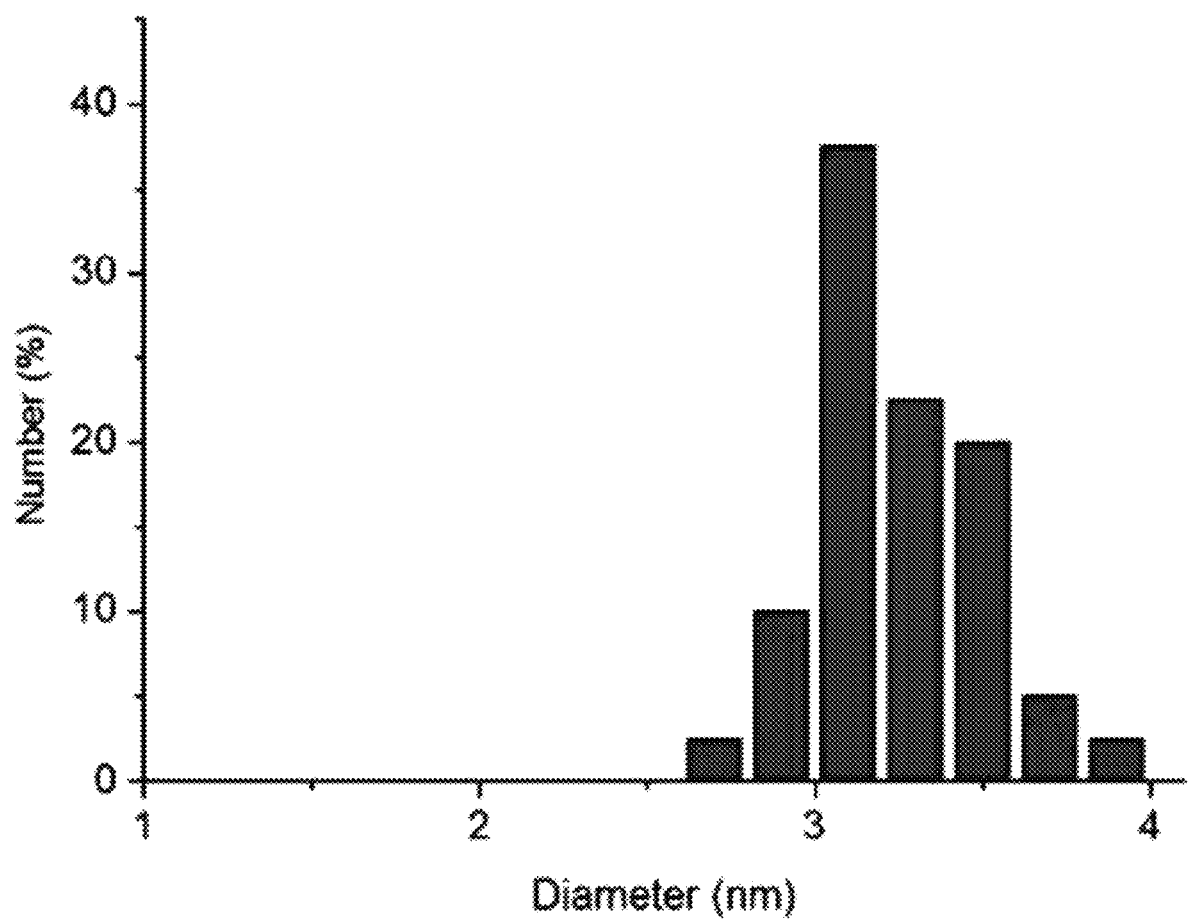

FIGS. 7A to 7C are high-magnification TEM photographs of polymer capsules loaded with Pd nanoparticles, and FIGS. 7D to 7F are views illustrating results obtained by measuring diameters of 200 loaded Pd nanoparticles. Here, FIGS. 7A and 7D illustrate the results of the sample prepared by adding 0.5 ml (0.50 µmol) of $K_2PdCl_4$ in Example, FIGS. 7B and 7E illustrate the results of the sample prepared by adding 0.5 ml (0.75 µmol) of $K_2PdCl_4$ in Example, and FIGS. 7C and 7F illustrate the results of the sample prepared by adding 0.5 ml (1.0 µmol) of $K_2PdCl_4$ in Example. It was confirmed that in the case in which 0.50 µmol of $K_2PdCl_4$ was added, the Pd nanoparticles had a size in a range of 1.7±0.2 nm, in the case in which 0.75 µmol of $K_2PdCl_4$ was added, the Pd nanoparticles had a size in a range of 1.9±0.2 nm, and in the case in which 1.0 µmol of $K_2PdCl_4$ was added, the Pd nanoparticles had a size in a range of 3.1±0.3 nm. However, it was confirmed that in the case in which 2.0 µmol or more of $K_2PdCl_4$ was added, an aggregate in which the polymer capsules were aggregated together with the Pd nanoparticles was prepared.

As illustrated in FIGS. 7A to 7F, it may be appreciated that the size of the Pd nanoparticles to be loaded may be adjusted by the amount of the water-soluble transition metal precursor. In addition, it may be appreciated that when the number of moles of the added water-soluble transition metal precursor was 1 to 4 times based on a total number of moles of the compound represented by Chemical Formula 1, used at the time of preparing the polymer capsule, individual polymer capsules loaded with the Pd nanoparticles in a state in which the Pd nanoparticles were spaced and dispersed apart from each other may be prepared.

Figure 8A:
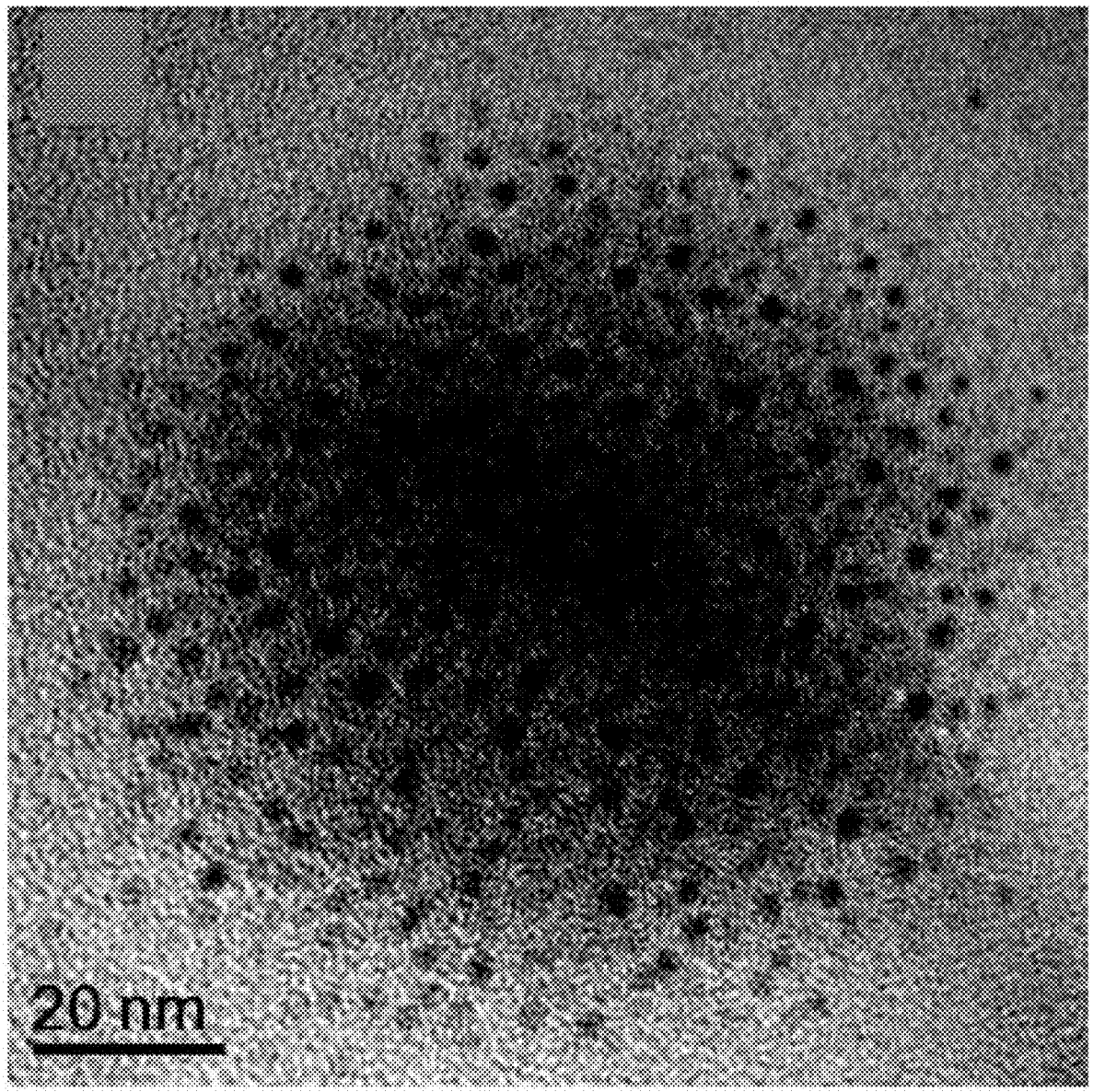
FIGS. 8A and 8C are a high-magnification TEM photograph of a prepared polymer capsule loaded with Au nanoparticles and a view illustrating a result obtained by measuring a diameter of the loaded transition metal nanoparticles (Au nanoparticles), respectively.
Figure 8B:
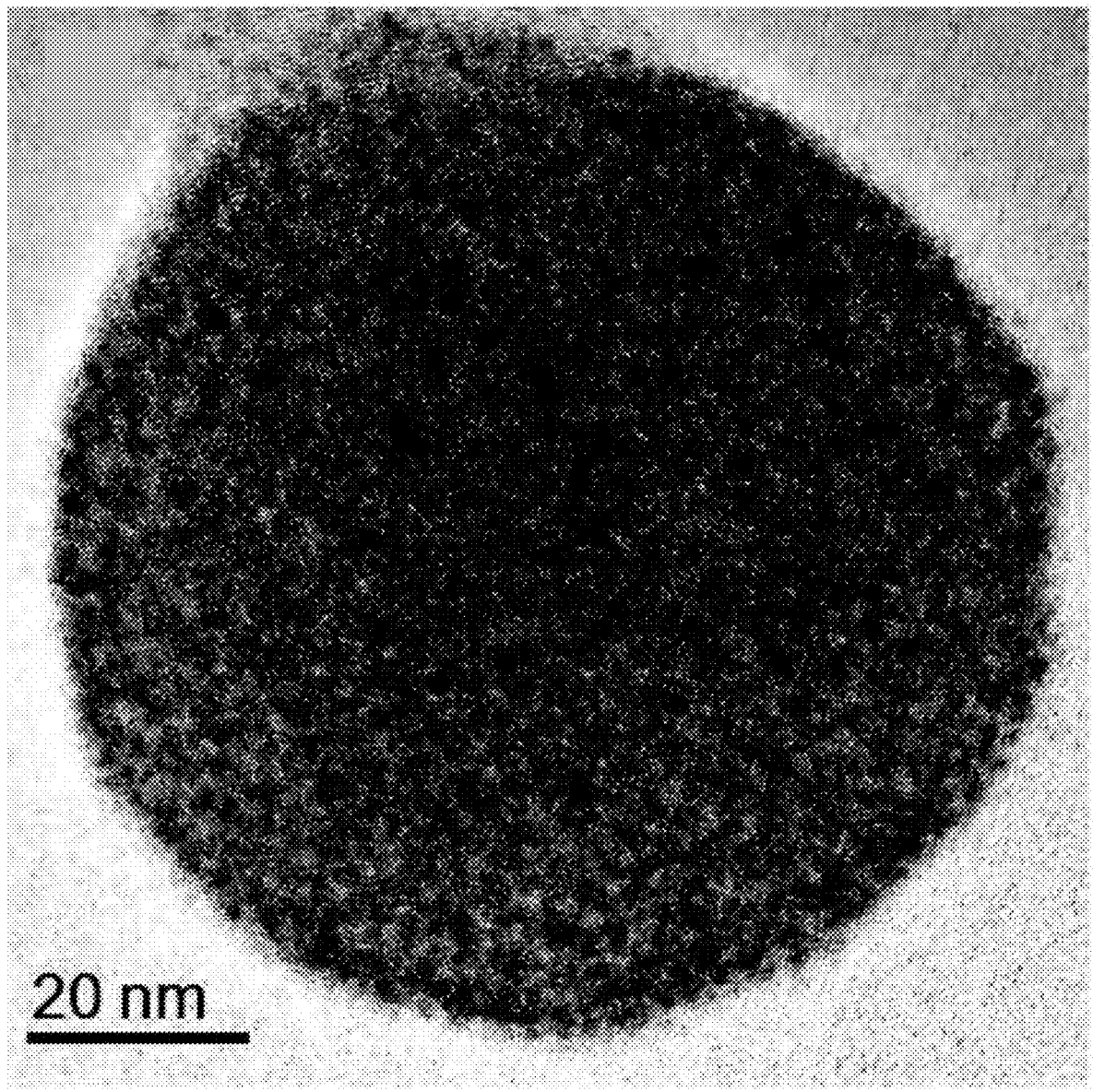
FIGS. 8B and 8D are a high-magnification TEM photograph of a polymer capsule loaded with Pt nanoparticles, and a view illustrating a result obtained by measuring a diameter of the loaded transition metal nanoparticles (Pt nanoparticles), respectively.
Figure 8C:
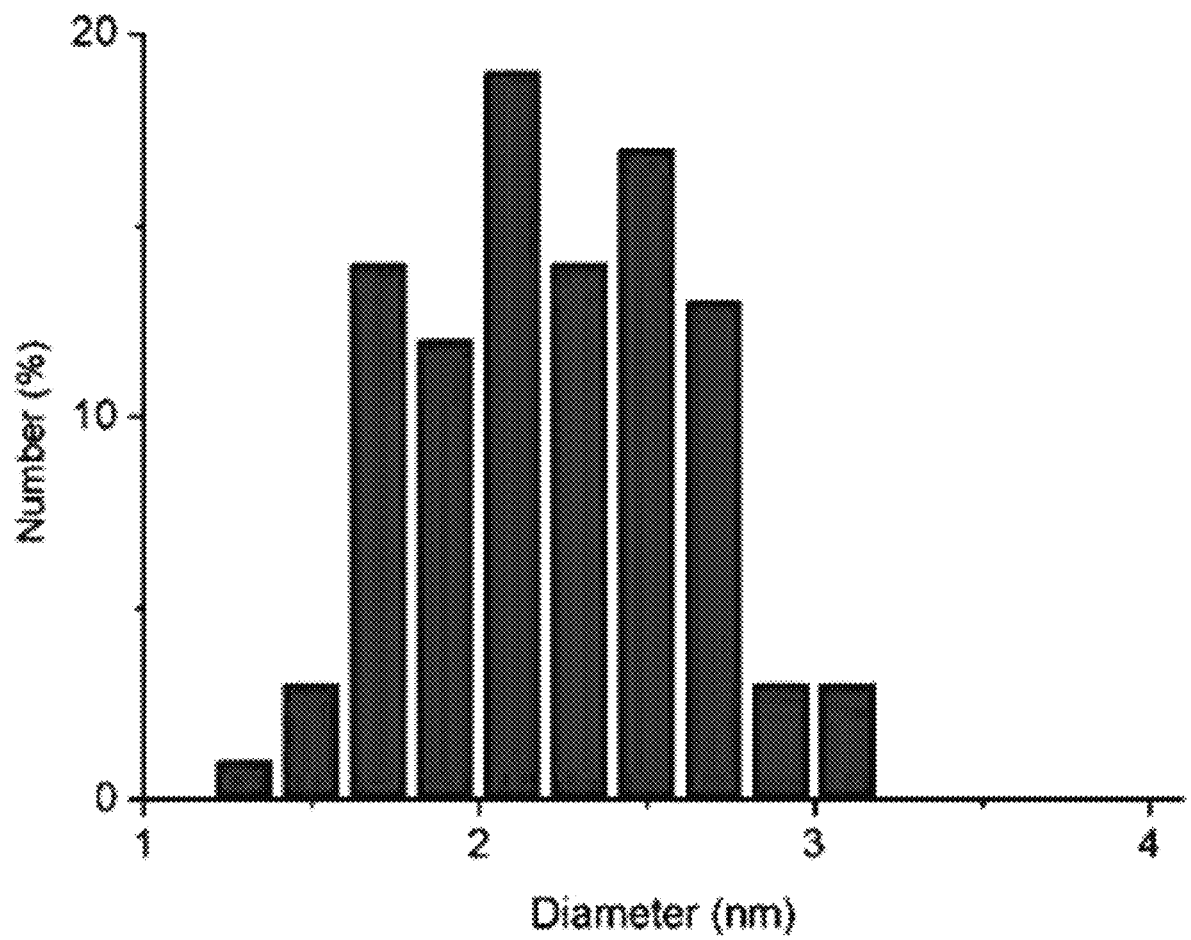
Figure 8D:
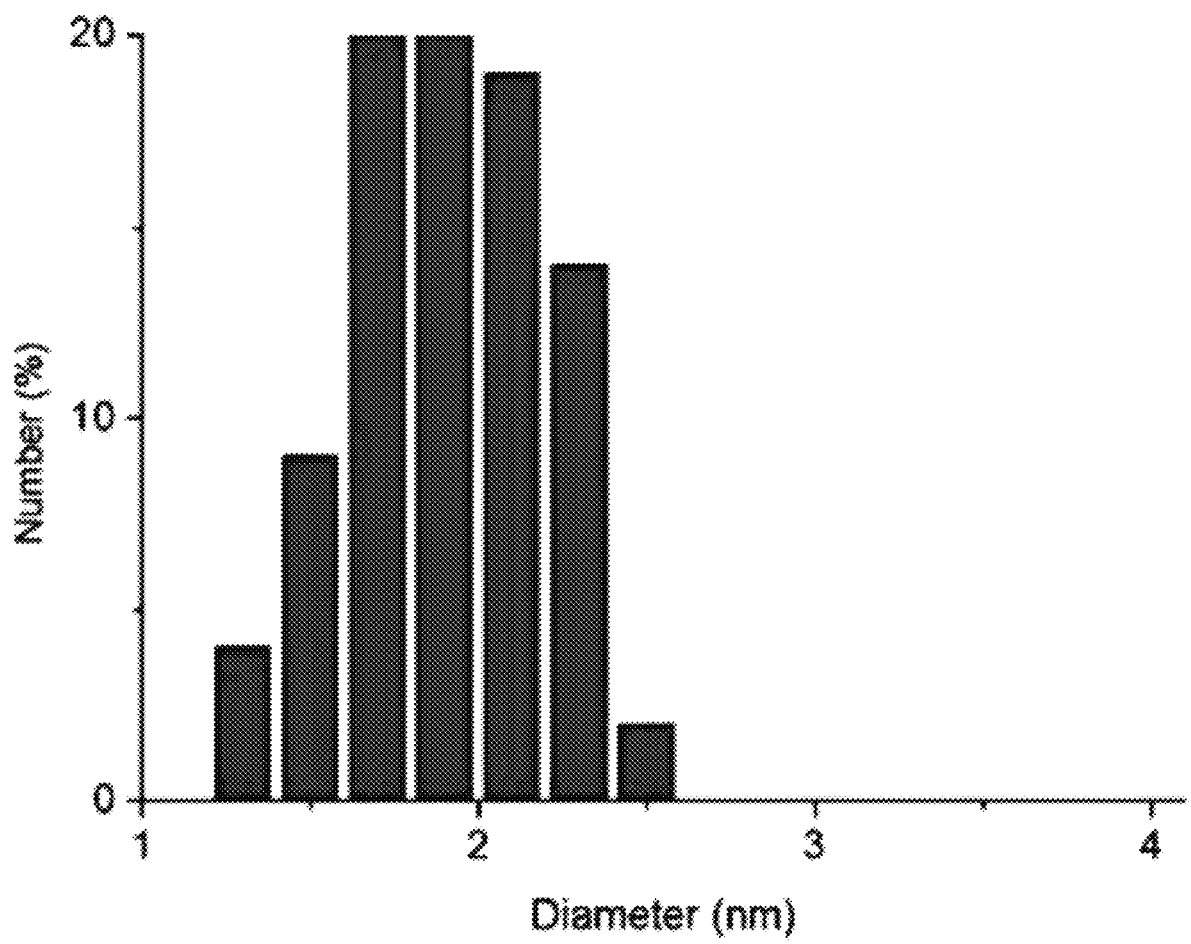

FIGS. 8A and 8C are a high-magnification TEM photograph of the prepared polymer capsule (FIG. 8A) loaded with Au nanoparticles and a view illustrating a result obtained by measuring a diameter of the loaded transition metal nanoparticles (Au nanoparticles), respectively, and FIGS. 8B and 8D are a high-magnification TEM photograph of the polymer capsule loaded with Pt nanoparticles, and a view illustrating a result obtained by measuring a diameter of the loaded transition metal nanoparticles (Pt nanoparticles), respectively. It may be confirmed that the loaded Au nanoparticles had a size in a range of 2.1±0.4 nm, and the loaded Pt nanoparticles had a size in a range of 1.8±0.3 nm, such that the transition metal nanoparticles having a significantly uniform size were loaded, similarly to Pt.

In order to confirm stability of the transition metal nanoparticles loaded on the prepared polymer capsule in water and heterogeneous catalytic activity thereof, a Suzuki-Miyaura reaction in water and a Buchwald-Hartwig amination reaction in a mixed solution of water and tetrahydrofuran (THF) were conducted. It was confirmed that at the time of using prepared polymer capsule loaded with Pd nanoparticles as a catalyst, and using $C_6H_5I$ and 4-(MeO)$C_6H_4$B(OH)$_2$ or $C_6H_5I$ and 4-(MeO)$C_6H_4NH_2$, a conversion rate of aryl iodide ($C_6H_5I$), which is a reactant, was 100%, respectively. In the case of the Suzuki-Miyaura reaction ($C_6H_5I$ and 4-(MeO)$C_6H_4$B(OH)$_2$), the conversion rate by the reaction in water at room temperature for 1 to 2 hours was measured, and the results are illustrated in the following Table 1. The conversion rate of aryl iodide was measured using gas chromatography-mass spectrometry (GC-MS).

TABLE 1

| entry | Ar-X | ArB(OH)$_2$ or ArNH$_2$ | Catalyst | Conversion (%) |
|---|---|---|---|---|
| 1 | $C_6H_5I$ | 4-(MeO)$C_6H_4$B(OH)$_2$ | 3 | 100% (1$^{st}$ run) |
| 2 | $C_6H_5I$ | 4-(MeO)$C_6H_4$B(OH)$_2$ | 3 | 100% (2$^{nd}$ run) |
| 3 | $C_6H_5I$ | 4-(MeO)$C_6H_4$B(OH)$_2$ | 3 | 100% (3$^{rd}$ run) |
| 4 | $C_6H_5I$ | 4-(MeO)$C_6H_4$B(OH)$_2$ | 3 | 100% (4$^{th}$ run) |
| 5 | $C_6H_5I$ | 4-(MeO)$C_6H_4$B(OH)$_2$ | 3 | 100% (5$^{th}$ run) |
| 6 | $C_6H_5I$ | 4-(MeO)$C_6H_4$B(OH)$_2$ | Pd/C | 62% |
| 7 | $C_6H_5I$ | 4-(MeO)C6H4NH2 | 3 | 100% |

In Table 1, number 3 in the catalyst category indicates a case in which the prepared polymer loaded with Pd nanoparticles was used as the catalyst, and Pd/C in the catalyst category indicates a case in which a Pd/C catalyst (purchased from Aldrich in) in which 10 wt % of Pd is loaded on carbon was used.

Figure 9:
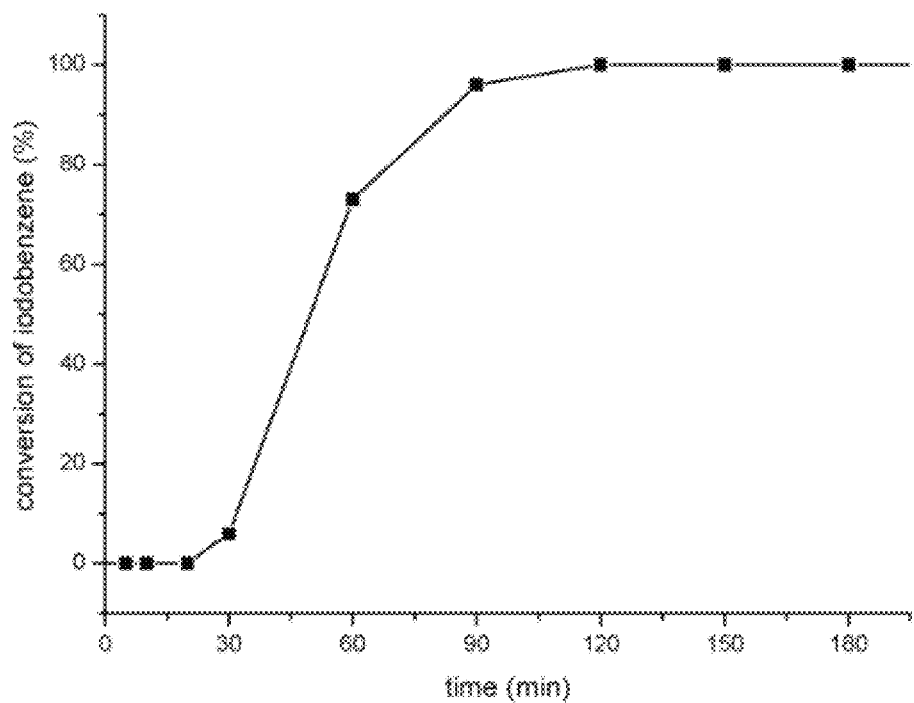
FIG. 9 is a view illustrating a result obtained by measuring a conversion rate of aryl iodide using the prepared polymer capsule loaded with Pd nanoparticles depending on a reaction time.

FIG. 9 is a view illustrating a result obtained by measuring a conversion rate of aryl iodide using the prepared polymer capsule loaded with Pd nanoparticles depending on a reaction time. As illustrated in FIG. 9, it may be appreciated that the conversion rate reached 100% after about 90 minutes or so.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

The invention claimed is:

1. A polymer capsule loaded with transition metal particles comprising:
    a surface-modified polymer capsule in which a surface of a polymer capsule is modified with $CH_3I$; and
    Pd particles loaded on a surface of the surface-modified polymer capsule,
    wherein the polymer capsule is obtained by copolymerizing a compound represented by the following Chemical Formula 3 and 3,6-dioxa-1,8-octanedithiol with each other, and the surface-modified polymer capsule has a positive zeta potential in a dispersed state in water:

[Chemical Formula 3]

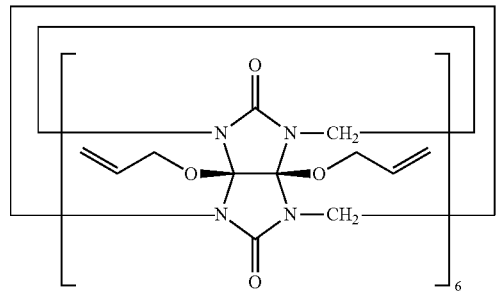

* * * * *